US010903930B1

(12) United States Patent
Moore

(10) Patent No.: US 10,903,930 B1
(45) Date of Patent: Jan. 26, 2021

(54) IN-SERVICE DEFRAGMENTATION IN OPTICAL NETWORKS USING WAVELENGTH CONVERSION

(71) Applicant: Fujitsu Limited, Kawasaki (JP)

(72) Inventor: Francois Georges Joseph Moore, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/779,245

(22) Filed: Jan. 31, 2020

(51) Int. Cl.
  *H04J 14/02* (2006.01)
  *H04B 10/25* (2013.01)
  *H04B 10/032* (2013.01)
  *H04Q 11/00* (2006.01)

(52) U.S. Cl.
  CPC ............ *H04J 14/021* (2013.01); *H04B 10/25* (2013.01); *H04J 14/0227* (2013.01); *H04B 10/032* (2013.01); *H04Q 11/00* (2013.01)

(58) Field of Classification Search
  CPC ...... H04J 14/021; H04J 14/0227; H04J 14/02; H04B 10/25; H04B 10/2507; H04B 10/10; H04B 10/079
  USPC .......................................................... 398/83
  See application file for complete search history.

(56) References Cited

U.S. PATENT DOCUMENTS

| | | | | |
|---|---|---|---|---|
| 6,583,900 B2 * | 6/2003 | Onaka | ................. | H04J 14/0204 398/59 |
| 7,366,426 B2 * | 4/2008 | Kai | ..................... | H04B 10/572 398/192 |
| 7,620,321 B2 * | 11/2009 | Miura | ................. | H04J 14/0209 398/45 |
| 8,331,779 B2 * | 12/2012 | Ooi | ...................... | G02B 6/2931 398/48 |
| 9,800,347 B2 * | 10/2017 | Nagamine | ........... | H04J 14/0221 |
| 9,857,662 B2 * | 1/2018 | Kato | .................... | H04J 14/0212 |
| 10,009,671 B2 * | 6/2018 | Younce | ............. | H04B 10/0791 |
| 10,257,594 B2 * | 4/2019 | Holmes | .............. | H04Q 11/0005 |
| 10,644,823 B2 * | 5/2020 | Yuki | ...................... | H04B 10/66 |
| 10,735,126 B1 * | 8/2020 | Koopferstock | ..... | H04J 14/0217 |
| 10,750,256 B1 * | 8/2020 | Moore | ............... | H04Q 11/0005 |
| 2003/0185567 A1 * | 10/2003 | Kurumida | ........... | H04J 14/0213 398/79 |
| 2009/0226172 A1 * | 9/2009 | Larikova | ............. | H04J 14/0212 398/83 |

(Continued)

*Primary Examiner* — Abbas H Alagheband
(74) *Attorney, Agent, or Firm* — Baker Botts L.L.P.

(57) ABSTRACT

A system for in-service defragmentation may identify optical signals having wavelengths within a first predefined optical wavelength band for transition from a current channel to an alternate channel within the first band and may determine directions and amounts by which to move the wavelengths. The identified wavelengths in the first band may be slowly and deliberately drifted by the determined amounts, using multiple incremental adjustments, and converted to corresponding wavelengths in a second predefined optical wavelength band for transmission. During the transitions, the drifting optical signals in the second band may be combined with optical signals remaining in their current channels in the first band for transmission. Once the wavelength transitions are complete, the transitioned optical signals may be transmitted on their alternate channels in the first band. Collections of wavelength transitions that do not cross each other may be identified and may be performed substantially in parallel.

20 Claims, 15 Drawing Sheets

(56) References Cited

U.S. PATENT DOCUMENTS

2019/0149259 A1\* 5/2019 Inada .................. H04B 10/073
                                                                                           398/83

\* cited by examiner

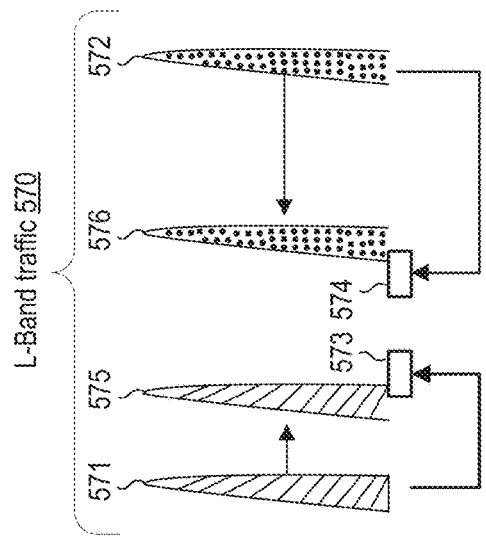
FIG. 10A
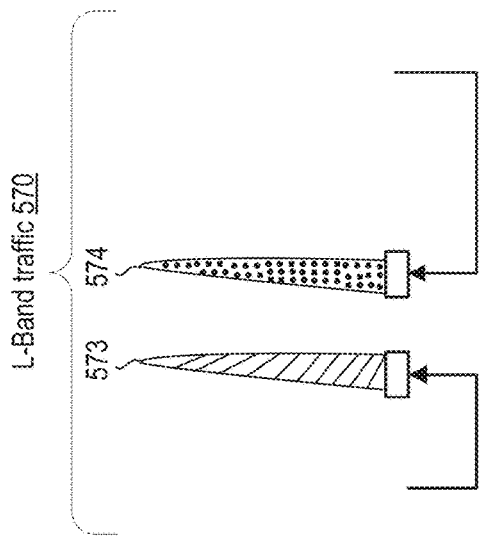
FIG. 10C
FIG. 10B
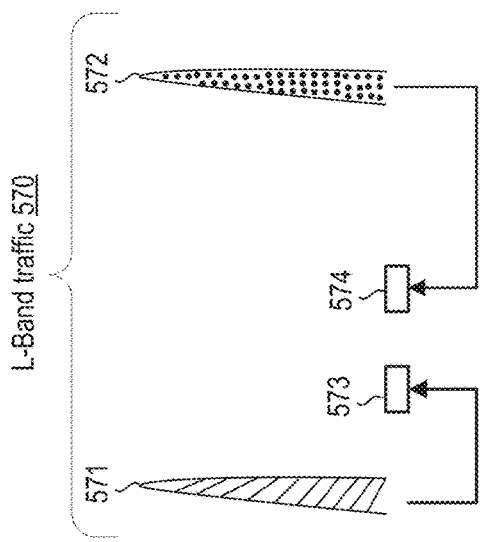
FIG. 10D

US 10,903,930 B1

IN-SERVICE DEFRAGMENTATION IN OPTICAL NETWORKS USING WAVELENGTH CONVERSION

BACKGROUND

Field of the Disclosure

The present disclosure relates generally to optical communication networks and, more particularly, to systems and methods for performing in-service defragmentation in optical networks using wavelength conversion.

Description of the Related Art

Telecommunications systems, cable television systems and data communication networks use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

Optical networks may also include various optical elements, such as amplifiers, dispersion compensators, multiplexer/demultiplexer filters, wavelength selective switches (WSS), optical switches, couplers, etc. to perform various operations within the network. Optical networks may also include various network elements, such as amplifiers, dispersion compensators, multiplexer/demultiplexer filters, wavelength selective switches, couplers, etc. configured to perform various operations within the network.

In some optical networks, network resource utilization in optical networks may be limited due to spectral slot fragmentation. In some cases, fiber capacity utilization may be increased through the use of recoloring elements, which are operable to shift individual optical channels to different wavelengths. For example, an optoelectronic wavelength converter, such as an optical-electrical-optical regenerator, converts a received optical signal to an electrical signal and then converts the electrical signal to an optical signal at a different targeted wavelength. Some all-optical wavelength shifters may be used to shift individual optical channels by a given amount.

SUMMARY

In one aspect, a system for in-service defragmentation of a transmission spectrum using wavelength conversion is disclosed. The system includes a fiber cable between a first location and a second location, a first collection of transponders at the first location, a first reconfigurable optical add-drop multiplexer (ROADM) at the first location, a first reconfigurable optical add-drop multiplexer (ROADM) at the first location, a first optical wavelength converter at the first location, and a first drop complex at the first location. The first collection of transponders is configured to generate optical signal traffic as optical signals having wavelengths within a first one of multiple predefined optical wavelength bands including optical signals having a first wavelength within the first predefined optical wavelength band identified as a wavelength to be moved from a first current channel to a first alternate channel within the first predefined optical wavelength band and optical signals having one or more other wavelengths within the first predefined optical wavelength band identified as wavelengths to remain on their respective current channels and to exchange the generated optical signal traffic with a second collection of transponders at the second location over the fiber cable. The first reconfigurable optical add-drop multiplexer (ROADM) is assigned to a first ROADM degree and includes a first band expansion port to receive optical signals and a band combiner. The second ROADM is assigned to a second ROADM degree. The first optical wavelength converter is coupled to receive optical signals from the second ROADM and is coupled to provide optical signals to the first ROADM via the first band expansion port. The first drop complex is configured to route the optical signals having the one or more other wavelengths within the first predefined optical wavelength band from the first collection of transponders to the first ROADM and to route the optical signals having the first wavelength from the first collection of transponders to the second ROADM. The first collection of transponders is further configured to deliberately drift the optical signals having the first wavelength in a predetermined first direction and by a predetermined first amount from the first wavelength to a second wavelength corresponding to the first alternate channel within the first predefined optical wavelength band while continuing to exchange the optical signal traffic with the second collection of transponders at the second location over the fiber cable. The first optical wavelength converter is configured to, while the first collection of transponders continues to exchange the optical signal traffic with the second collection of transponders at the second location over the fiber cable, convert optical signals received from the second ROADM and having wavelengths within the first predefined optical wavelength band to corresponding optical signals having respective wavelengths within a second one of the multiple predefined optical wavelength bands and provide the converted optical signals to the first ROADM via the first band expansion port as first converted signals. The first drop complex is further configured to route the drifting optical signals previously having the first wavelength from the first collection of transponders to the second ROADM. The band combiner is configured to combine the first converted optical signals having respective wavelengths within the second predefined optical wavelength band and received via the first band expansion port with the optical signals having the one or more other wavelengths within the first predefined optical wavelength band to generate the optical signal traffic exchanged between the first collection of transponders at the first location and the second collection of transponders at the second location over the fiber cable.

In any of the disclosed embodiments, the first drop complex may be further configured to, subsequent to the optical signals having the first wavelength being moved to the second wavelength corresponding to the first alternate channel within the first predefined optical wavelength band, route the optical signals having the second wavelength from the first collection of transponders to the first ROADM.

In any of the disclosed embodiments, the first wavelength may be one of a plurality of wavelengths generated by the first collection of transponders and identified as wavelengths to be moved from a respective current channel to a respective alternate channel within the first predefined optical wavelength band, the plurality of identified wavelengths including a third wavelength within the first predefined optical wavelength band, the first drop complex may be further configured to route the optical signals having the third wavelength from the first collection of transponders to the second ROADM, the first collection of transponders may be further configured to deliberately drift the optical signals having the third wavelength in a predetermined second direction and by a predetermined second amount from the third wavelength to a fourth wavelength corresponding to the respective alternate channel within the first predefined optical wavelength band for the optical signals having the third wavelength while continuing to exchange the optical signal traffic with the second collection of transponders at the second location over the fiber cable and substantially in parallel with deliberately drifting the optical signals having the first wavelength in the predetermined first direction and by the predetermined first amount to the second wavelength within the second predefined optical wavelength band, the first optical wavelength converter may be further configured to, while the first collection of transponders continues to exchange the optical signal traffic with the second collection of transponders at the second location over the fiber cable and simultaneously with converting the optical signals received from the second ROADM and having wavelengths within the first predefined optical wavelength band to respective optical signals having wavelengths within the second predefined optical wavelength band and providing the first converted optical signals to the first ROADM, convert optical signals received from the second ROADM and having wavelengths within the third predefined optical wavelength band to corresponding optical signals having respective wavelengths within the second predefined optical wavelength band and provide the converted optical signals to the first ROADM via the first band expansion port as second converted signals, and the first drop complex may be further configured to route the drifting optical signals previously having the third wavelength from the first collection of transponders to the second ROADM.

In any of the disclosed embodiments, the system may further include a software-defined networking (SDN) controller configured to perform one or more of identifying the first wavelength and the third wavelength as wavelengths to be moved from a respective current channel to a respective alternate channel within the first predefined optical wavelength band, the identifying including determining a respective direction in which to move the each identified wavelength and a respective amount by which to move each identified wavelength, identifying the one or more other wavelengths within the first predefined optical wavelength band identified as wavelengths to remain on their respective current channels, issuing a command to the first drop complex to cause the first drop complex to route the optical signals having the one or more other wavelengths within the first predefined optical wavelength band from the first collection of transponders to the first ROADM and to route the optical signals having the first wavelength and optical signals having the third wavelength from the first collection of transponders to the second ROADM, issuing a command to the first optical wavelength converter to convert the optical signals received from the second ROADM and having wavelengths within the first predefined optical wavelength band to the respective optical signals having wavelengths within the second predefined optical wavelength band and to provide the converted optical signals to the first ROADM via the first band expansion port, issuing a command to the first collection of transponders to cause the first collection of transponders to deliberately drift the optical signals having the first wavelength in the predetermined first direction and by the predetermined first amount from the first wavelength to the second wavelength corresponding to the first alternate channel within the first predefined optical wavelength band and, substantially in parallel, to deliberately drift the optical signals having the third wavelength in a predetermined second direction and by a predetermined second amount from the third wavelength to a fourth wavelength corresponding to the respective alternate channel within the first predefined optical wavelength band for the optical signals having the third wavelength, and issuing a command to the first drop complex to cause the first drop complex to route the drifting optical signals previously having the first wavelength and the drifting optical signals previously having the third wavelength from the first collection of transponders to the second ROADM.

In any of the disclosed embodiments, the SDN controller may be further configured to determine two or more non-overlapping collections of wavelengths within the plurality of wavelengths generated by the first collection of transponders and identified as wavelengths to be moved from a respective current channel to a respective alternate channel within the first predefined optical wavelength band in which the optical signals having the wavelengths in the collection can be drifted to wavelengths within the second predefined optical wavelength band corresponding to their respective alternate channels substantially in parallel without interfering with each other, a first one of the two or more collections of wavelengths including the first wavelength and the third wavelength, and, subsequent to the optical signals having wavelengths in the first collection of wavelengths being moved from their respective current channels to their respective alternate channels, to issue one or more commands to cause optical signals having wavelengths within a second one of the two or more collections of wavelengths to be moved from their respective current channels to their respective alternate channels.

In any of the disclosed embodiments, the system may further include, at the second location, a third ROADM assigned to a third ROADM degree and including a second band expansion port, a fourth ROADM assigned to a fourth ROADM degree, a second optical wavelength converter coupled to receive optical signals from the third ROADM via the second band expansion port and coupled to provide converted optical signals to the fourth ROADM, the second optical wavelength converter being configured to convert optical signals having wavelengths within the second predefined optical wavelength band to respective optical signals having wavelengths within the first predefined optical wavelength band, a band splitter of the third ROADM, and a second drop complex. The band splitter may be configured to receive optical traffic over the fiber cable including optical signals having wavelengths within the first predefined optical wavelength band and optical signals having wavelengths within the second predefined optical wavelength band and to route the optical signals having wavelengths within the second predefined optical wavelength band to the second optical wavelength converter via the second band expansion port. The second drop complex may be configured to combine the optical signals received over the fiber cable by the third ROADM and having wavelengths within the first predefined optical wavelength with the converted optical signals received from the second optical wavelength converter by the fourth ROADM and having wavelengths within the first predefined optical wavelength band and to provide the combined optical signals to the second collection of transponders.

In another aspect, a method for defragmentation of a transmission spectrum using wavelength conversion is disclosed. The method includes beginning to exchange optical signal traffic between a first location and a second location over a fiber cable of an optical transport network, the optical signal traffic including optical signals generated at the first location and having wavelengths within a first one of multiple predefined optical wavelength bands, identifying a first wavelength within the first predefined optical wavelength band as a wavelength for which optical signals generated at the first location and having the wavelength are to be moved from a first current channel to a first alternate channel within the first predefined optical wavelength band, the identifying including determining a first direction in which to move the first wavelength and a first amount by which to move the first wavelength, identifying optical signals generated at the first location and having one or more other wavelengths within the first predefined optical wavelength band as optical signals having wavelengths to remain on their respective current channels. The method may also include, while continuing to exchange the optical signal traffic between the first location and the second location over the fiber cable, routing the optical signals having the one or more other wavelengths within the first predefined optical wavelength band to a first reconfigurable optical add-drop multiplexer (ROADM) at the first location, routing the optical signals having the first wavelength to a second ROADM at the first location, beginning to deliberately drift the optical signals having the first wavelength in the determined first direction and by the determined first amount from the first wavelength to a second wavelength corresponding to the first alternate channel within the first predefined optical wavelength band, routing the drifting optical signals previously having the first wavelength to the second ROADM, converting, at the first location, optical signals routed to the second ROADM and having wavelengths within the first predefined optical wavelength band to corresponding optical signals having respective wavelengths within a second one of the multiple predefined optical wavelength bands, and combining, at the first location, the converted optical signals having respective wavelengths within the second predefined optical wavelength band with the optical signals having the one or more other wavelengths within the first predefined optical wavelength band to generate combined optical signal traffic to be transmitted from the first location to the second location over the fiber cable.

In any of the disclosed embodiments, the method may further include, at the second location, receiving, by a third ROADM, the combined optical signal traffic, routing the optical signals within the received combined optical signal traffic and having wavelengths within the second predefined optical wavelength band to a second optical wavelength converter, converting the optical signals routed to the second optical wavelength converter and having wavelengths within the second predefined optical wavelength band to corresponding optical signals having respective wavelengths with the first predefined optical wavelength band, routing the converted optical signals having respective wavelengths within the first predefined optical wavelength band from the second optical wavelength converter to a fourth ROADM, and combining the optical signals within the received combined optical signal traffic and having wavelengths within the first predefined optical wavelength with the converted optical signals received from the second optical wavelength converter by the fourth ROADM and having wavelengths within the first predefined optical wavelength band.

In any of the disclosed embodiments, identifying the first wavelength may include identifying a plurality of wavelengths generated at the first location and identified as wavelengths to be moved from a respective current channel to a respective alternate channel within the first predefined optical wavelength band, the plurality of identified wavelengths including the first wavelength and a third wavelength within the first predefined optical wavelength band. The method may further include determining a second direction in which to move the third wavelength and a second amount by which to move the first wavelength, and, while continuing to exchange the optical signal traffic between the first location and the second location over the fiber cable, routing optical signals having the third wavelength to the second ROADM at the first location, beginning to deliberately drift the optical signals having the third wavelength in the determined second direction and by the determined second amount from the third wavelength to a fourth wavelength corresponding to the respective alternate channel within the first predefined optical wavelength band for the optical signals having the third wavelength substantially in parallel with beginning to deliberately drift the optical signals having the first wavelength in the determined first direction and by the determined first amount from the first wavelength to the second wavelength corresponding to the first alternate channel within the first predefined optical wavelength band, and routing the drifting optical signals previously having the third wavelength to the second ROADM. Converting optical signals routed to the second ROADM and having wavelengths within the first predefined optical wavelength band to corresponding optical signals having respective wavelengths within the second predefined optical wavelength band may include converting the optical signals previously having the third wavelength to corresponding optical signals having respective wavelengths within the second predefined optical wavelength band simultaneously with converting the optical signals previously having the first wavelength to corresponding optical signals having respective wavelengths within the second predefined optical wavelength band.

In any of the disclosed embodiments, the method may further include determining two or more non-overlapping collections of wavelengths within the plurality of wavelengths generated at the first location and identified as wavelengths to be moved from a respective current channel to a respective alternate channel within the first predefined optical wavelength band in which the optical signals having the wavelengths in the collection can be drifted to wavelengths within the second predefined optical wavelength band corresponding to their respective alternate channels substantially in parallel without interfering with each other, a first one of the two or more collections of wavelengths including the first wavelength and the third wavelength, and, subsequent to the optical signals having wavelengths in the first collection of wavelengths being moved from their respective current channels to their respective alternate channels, moving optical signals having wavelengths in a second one of the two or more collections of wavelengths from their respective current channels to their respective alternate channels.

In any of the disclosed embodiments, at least one of identifying the plurality of wavelengths generated at the first location and identified as wavelengths to be moved from a respective current channel to a respective alternate channel within the first predefined optical wavelength band and determining the two or more collections of wavelengths within the plurality of wavelengths generated at the first location and identified as wavelengths to be moved from a respective current channel to a respective alternate channel within the first predefined optical wavelength band in which the optical signals having the wavelengths in the collection can be drifted to wavelengths within the second predefined optical wavelength band corresponding to their respective alternate channels substantially in parallel without interfering with each other may be performed automatically by a software-defined networking (SDN) controller in response to a request to perform a defragmentation operation.

In any of the disclosed embodiments, deliberately drifting the optical signals having the first wavelength in the predetermined first direction and by the predetermined first amount from the first wavelength to the second wavelength may include performing a series of incremental adjustments to the wavelength of the optical signals previously having the first wavelength in the predetermined first direction that collectively transition the wavelength of the optical signals previously having the first wavelength by the predetermined first amount.

In any of the disclosed embodiments, for each of the two or more collections of wavelengths, a predetermined direction in which each of the optical signals having wavelengths in the collection of wavelengths are deliberately drifted is a same direction.

In any of the disclosed embodiments, the first wavelength converter may include a nonlinear medium that converts wavelengths within the first one of the multiple predefined optical wavelength bands to respective wavelengths within the second one of the multiple predefined optical wavelength bands.

In any of the disclosed embodiments, the multiple predefined optical wavelength bands may include two or more of the C-Band, comprising wavelengths between 1530 and 1565 nanometers, the L-Band, comprising wavelengths between 1565 and 1625 nanometers, and the S-Band, comprising wavelengths between 1460 and 1530 nanometers.

In any of the disclosed embodiments, the first predefined optical wavelength band may be the C-Band and the second predefined optical wavelength band may be the L-Band.

BRIEF DESCRIPTION OF THE DRAWINGS

For a more complete understanding of the present invention and its features and advantages, reference is now made to the following description, taken in conjunction with the accompanying drawings, in which:

FIGS. 10A-10D illustrate the transition of two wavelengths from their original respective channels within the second optical wavelength band to respective alternate channels within the second optical wavelength band, in accordance with some embodiments;

DESCRIPTION OF PARTICULAR EMBODIMENT(S)

Figure 1:
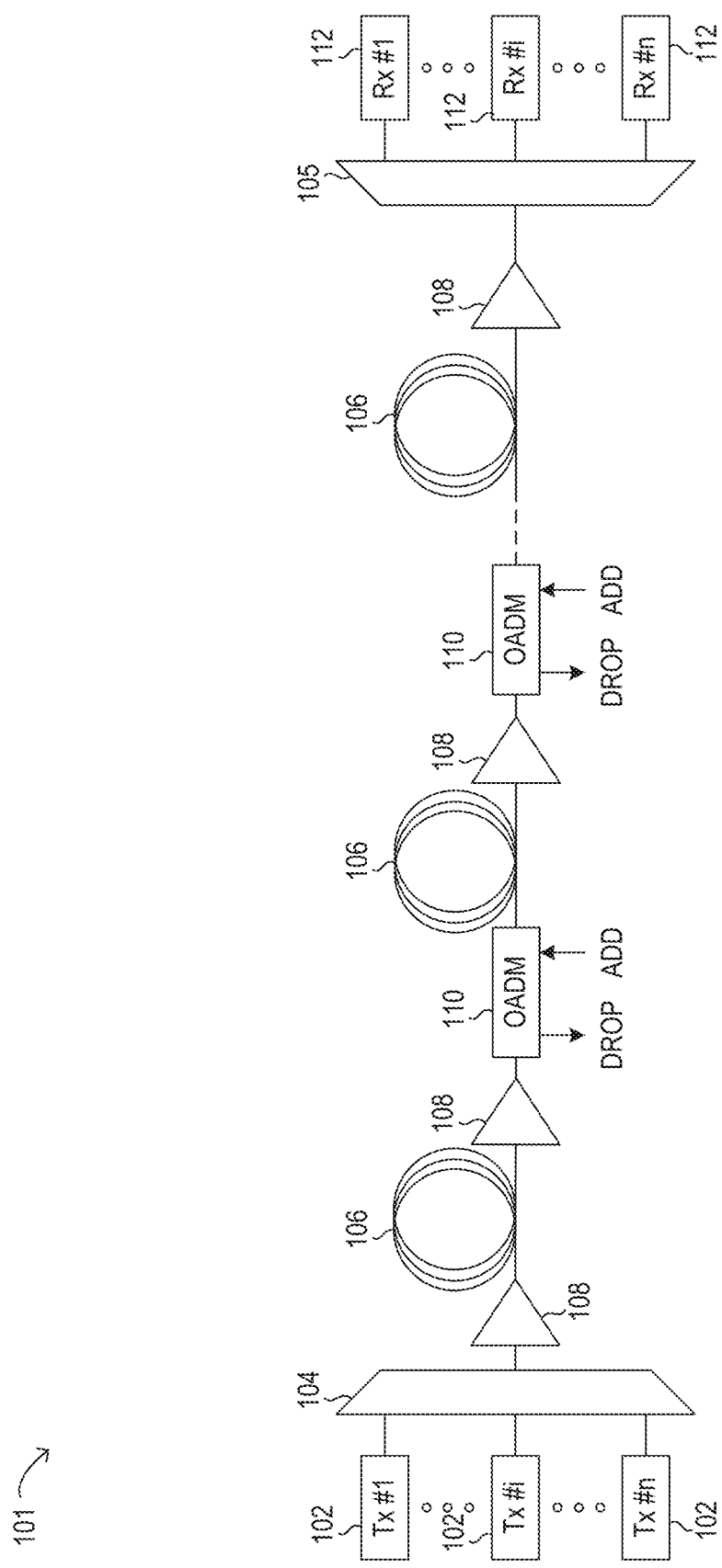
FIG. 1 is a block diagram illustrating selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical transport network 101, which may represent an optical communication system. Optical transport network 101 may include one or more optical fibers 106 to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Terabit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a channel that is included in an optical signal. Each channel may carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength and transmit the beam for carrying the signal throughout optical transport network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before or after certain lengths of fiber 106. Optical amplifiers 108 may comprise a system, apparatus, or device to amplify optical signals. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the photons in the doped portion of the optical fiber, which increases the intensity of the optical signal. For example, in some optical networks, each of optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) or a multicast switch (MCS) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a ninety-six (96) channel DWDM signal. Demultiplexer 105 may divide the single, ninety-six channel DWDM signal into ninety-six separate signals according to the ninety-six different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

Figure 14:
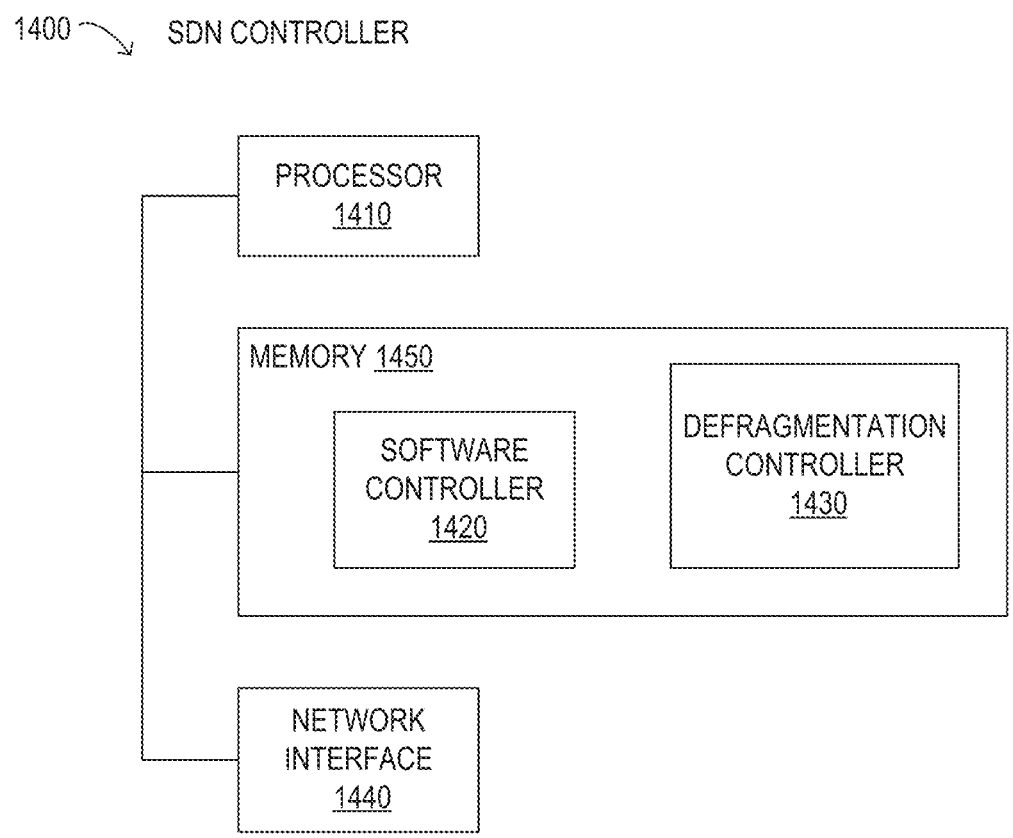
FIG. 14 is a block diagram illustrating selected elements of an embodiment of SDN controller.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations. In some embodiments, the management plane may include a software-defined networking (SDN) controller that, in accordance with program instructions executing on the SDN controller and configured to implement various network management functions, issues commands to particular network elements and/or components thereof in optical transport network 101. Selected elements of an example SDN controller are illustrated in FIG. 14 and described below.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

Figure 2A:
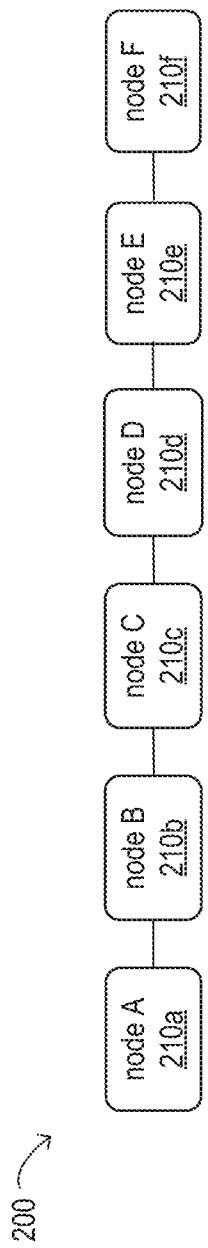
FIG. 2A is a block diagram illustrating multiple nodes of an embodiment of an optical transport network.
Figure 2B:
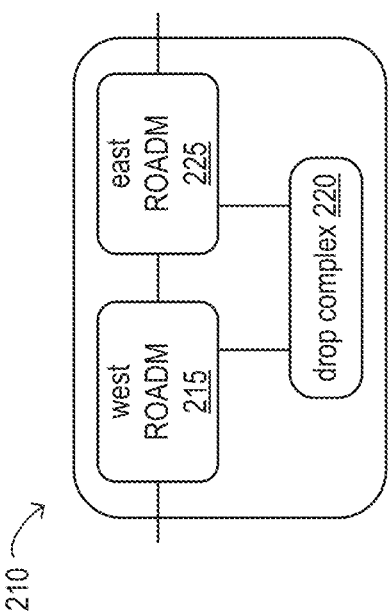
FIG. 2B is a block diagram illustrating selected elements of an embodiment of a single node in the optical transport network depicted in FIG. 2A.

FIG. 2A is a block diagram illustrating multiple nodes 210 of an optical transport network 200, in accordance with some embodiments. In the illustrated embodiment, network 200 is formed by an arbitrary linear topology of ROADM nodes 210 at respective locations. In other embodiments, network 200 may include a topology other than a linear topology. FIG. 2B is a block diagram illustrating selected elements of an embodiment of a single node 210 in the optical transport network depicted in FIG. 2A. In the illustrated embodiment, node 210 includes an east side ROADM 225, a west side ROADM 215, and a drop complex 220. In some embodiments, and in certain circumstances, one or more wavelengths may be added or dropped by ROADM 225 or by ROADM 215 in a given node 210 before the optical signals received at the given node 210 are passed to a neighboring node 210 in the west or east direction, according to the linear topology of network 200. In other embodiments and/or in other circumstances, the optical signals received at a given node 210 may be passed through the given node 210 to a neighboring node 210 in the west or east direction without any wavelengths being added or dropped by ROADM 225 or ROADM 215. In some embodiments, drop complex 220 may include one or more switches, multiplexers, or demultiplexers configured to route optical signal traffic to, from, and between various network components within node 210.

In optical transport networks, such as optical transport network 101 illustrated in FIG. 1 and optical transport network 200 illustrated in FIG. 1, wavelengths may be created and deleted over time resulting in fragmentation within the spectrum usage. For example, in some existing systems, all optical signal traffic is exchanged on channels within the C-Band portion of the optical spectrum. The C-Band can accommodate up to 96 distinct wavelengths, which can be assigned in any arbitrary order. The wavelengths may initially be assigned in an orderly fashion for efficient use of the available spectrum. However, as circuits are created, deleted, and/or moved over time, the spectrum may not be optimally used. This may lead to a blocking situation in which there is not a single wavelength available on which to exchange optical signal traffic directly between two particular points on the linear chain even if, technically, there is plenty of spectrum available.

Some existing defragmentation approaches involve analyzing every individual circuit and trying to reuse the same wavelength for non-overlapping circuits. Once the optimal wavelength allocation is determined, all of the affected circuits must be modified to match the results of the defragmentation calculation. For example, a defragmentation algorithm may identify which wavelengths to move and the direction and amount by which to move each identified wavelength. Given this information, optical transmission service carriers can recolor their wavelengths for each individual circuit to optimally use the available wavelengths. However, in existing systems, wavelength reassignments cannot typically be assigned which the optical transport network is in service. Therefore, end customers would lose service while the reassignments are applied, which is a lengthy process. In existing systems, wavelength is not easily automated due to the fact that it affects optical transmission services.

While optical transmission service carriers typically use the C-Band to carry optical signal traffic, other optical wavelength bands are also capable of carrying optical traffic. As will be described in further detail, systems and methods are disclosed herein for performing in-service defragmentation of the transmission spectrum in optical networks using wavelength conversion. More specifically, the systems described herein may implement an approach to defragmentation that utilizes previously unused fiber capacity in an optical wavelength band other than the optical wavelength band within which the wavelengths of the optical signal traffic being transmitted between locations fall. In at least some embodiments, using a wavelength converter to move wavelengths being transitioned as part of a defragmentation operation to an alternate optical wavelength band during transition may guarantee that the defragmentation operation can be performed in service and without affecting the unaffected.

The techniques described herein may enable in-service defragmentation and/or wavelength reassignment in optical transport networks. They do not require the use of an alternate fiber during defragmentation operations. In some embodiments, these techniques may be partially or completely automated using an SDN controller. The disclosed techniques are not dependent on any particular defragmentation algorithm. Rather, any suitable commercial, standard, or custom defragmentation algorithm may be used to determine which wavelengths should be moved, along with the respective directions and amounts by which they should be moved, after which the techniques described herein may be applied to implement the defragmentation while the optical transport network remains in service and without significantly disrupting the traffic.

Figure 3A:
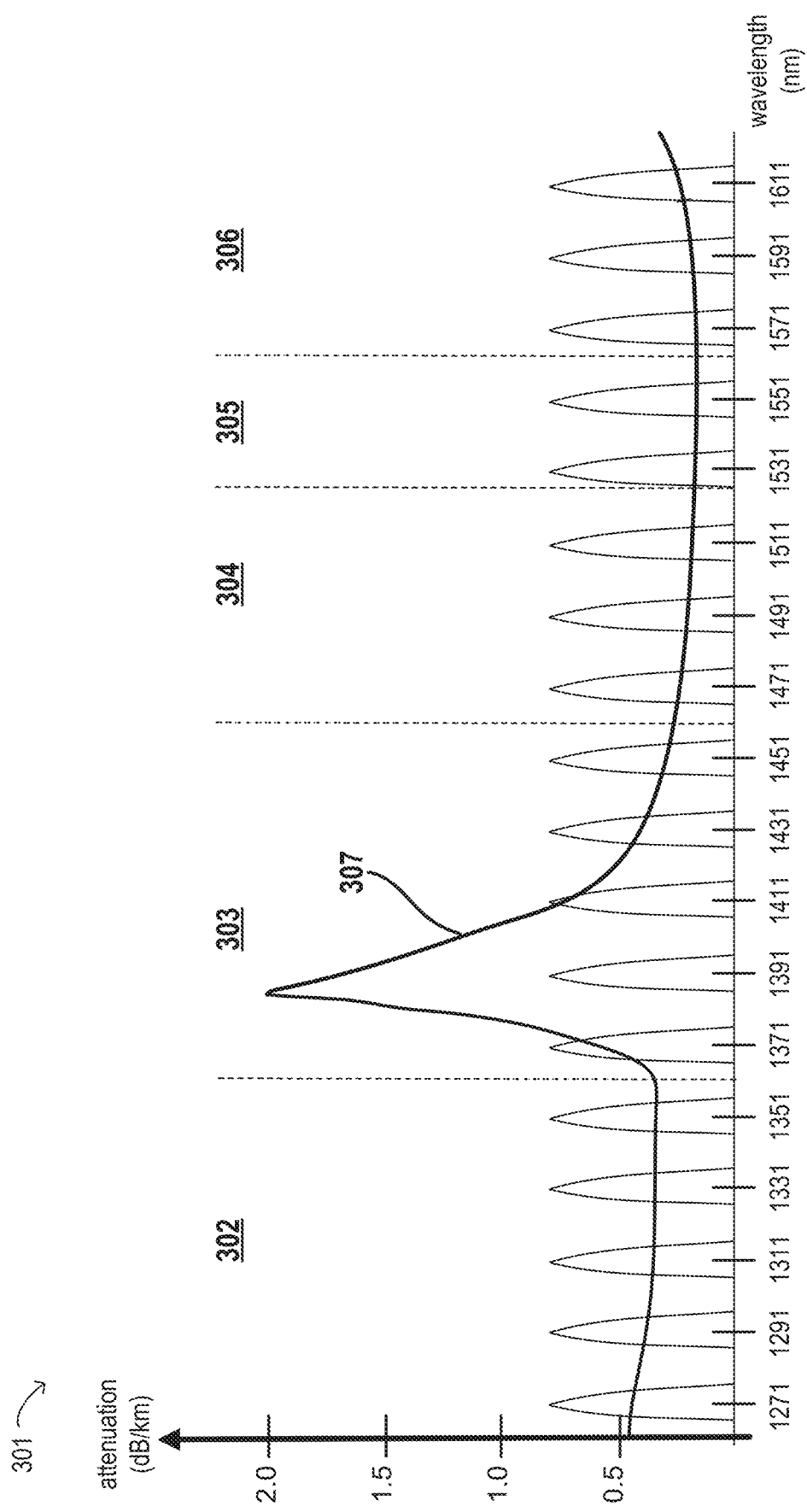
FIG. 3A is a graph illustrating five standard predefined optical wavelength bands.

FIG. 3A is a graph 301 illustrating five optical wavelength bands defined by the International Telecommunication Union Telecommunication Standardization Sector (ITU-T) and corresponding measurements of transmission performance in terms of attenuation. These predefined optical wavelength bands include the "Short wavelength" S-Band, shown as 304, comprising wavelengths between 1460 and 1530 nanometers, the "Center" C-Band, shown as 305, comprising wavelengths between 1530 and 1565 nanometers, and the "Long wavelength" L-Band, shown as 306, comprising wavelengths between 1565 and 1625 nanometers. The use of particular ones of these optical wavelength bands for telecommunication services may be more common in certain regions that in others. For example, carriers in North America typically use the C-Band to carry optical signal traffic. There are 96 channels in the C-Band, each corresponding to a respective wavelength between 1530 and 1565 nanometers. Each of the channels may typically operate at a data rate on the order of 100 Gbits/s, for a total of approximately 10 Terabits/s, or at a data rate of up to 200 Gbits/s, for a total of approximately 20 Terabits/s. Another commonly used optical wavelength band, e.g., in Japan, is the L-Band comprising wavelengths between 1565 and 1625 nanometers. The S-Band is also available for optical signal traffic, but it is not typically used for this purpose in existing optical networks.

The optical wavelength bands defined by the ITU-T also include additional optical wavelength bands not typically used for optical signal traffic. These include the "Original" O-Band, shown as 302, comprising wavelengths between 1260 and 1360 nanometers, and the "Extended" E-Band, shown in 303, comprising wavelengths between 1360 and 1460 nanometers. A sixth wavelength band defined by the ITU-T is the "Ultra-long wavelength" U-Band (not shown in FIG. 3A), which comprises wavelengths between 1625 and 1675 nanometers.

As shown by performance curve 307 in FIG. 3A, the performance of optical transmissions in the C-Band and in the L-Band are largely the same except that the L-Band has slightly poorer performance, i.e., slightly more attenuation, at the extreme right end of the band. The S-Band also exhibits reasonable transmission performance across the band with slightly poorer performance at the extreme left end of the band. By way of contrast, the E-Band performance exhibits a large water peak that renders it largely unusable.

Figure 3B:
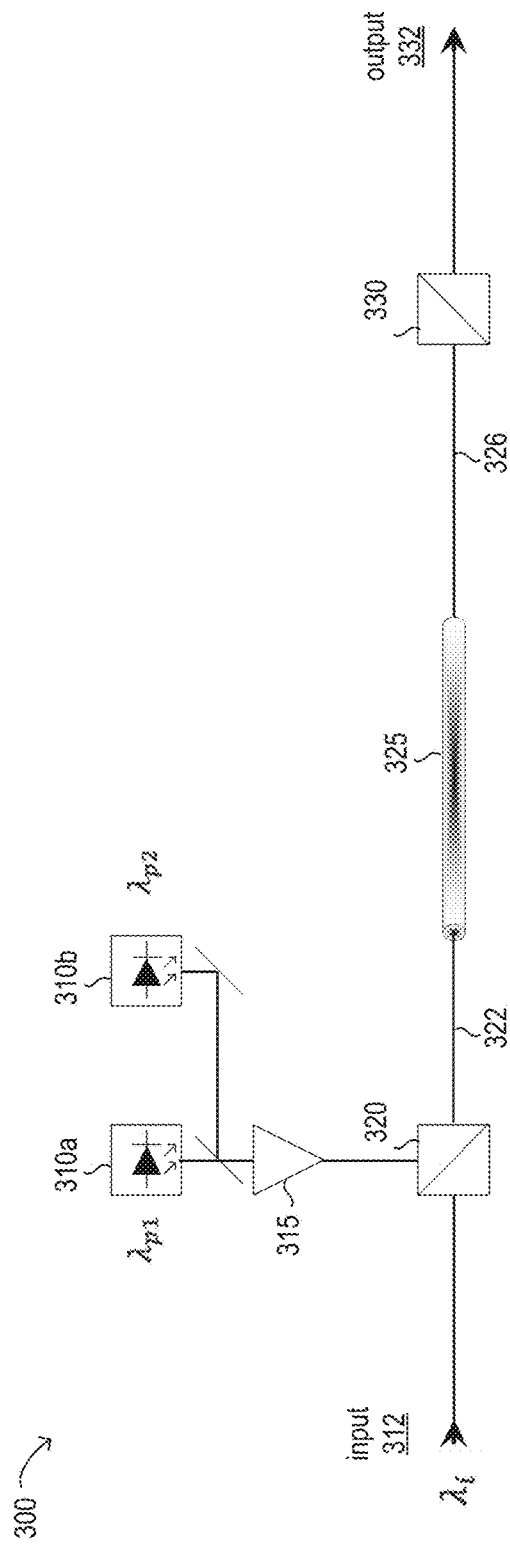
FIG. 3B is a block diagram illustrating selected elements of an embodiment of an optical wavelength converter.

FIG. 3B is a block diagram 300 illustrating selected elements of an embodiment of an optical wavelength converter. In the example embodiment illustrated in FIG. 3B, the wavelength converter includes two pump light sources 310 shown as pump light source 310a, which provides a light source having a wavelength $\lambda_{p1}$ and pump light source 310b, which provides a light source having a wavelength $\lambda_{p2}$. The wavelength converter also includes pump 315, polarization beam combiner 320, and a nonlinear medium 320. An input optical signal 312 having a wavelength $\lambda_i$ is combined, at polarization beam combiner 320, with the output of pump 315, resulting in the optical signal 322. Optical signal 322 then passes through nonlinear medium 325 where it is converted to an optical signal 326 in a different optical wavelength band than the input optical signal 312.

The nonlinear medium 325 may convert wavelengths within a first predefined optical wavelength band to respective wavelengths within a second predefined optical wavelength band. For example, the nonlinear medium 325 may be selected, fabricated, or configured to perform a desired wavelength conversion from a particular first one of the standard predefined optical wavelength bands (e.g., the C-Band, L-Band, or S-Band) to a particular second one of the standard predefined optical wavelength bands.

The converted optical signal 326 may be provided to polarization beam splitter 330, the output of which, shown as 332, includes two components. One component, i.e., the component of the converted signal having the shorter $\lambda$, may be represented mathematically as follows:

$$\lambda_{cs} = (\lambda_i^{-1} + |\lambda_{p1}^{-1} - \lambda_{p2}^{-1}|)^{-1}$$

A second component, i.e., the component of the converted signal having the longer $\lambda$, may be represented mathematically as follows:

$$\lambda_{cl} = (\lambda_i^{-1} + |\lambda_{p1}^{-1} - \lambda_{p2}^{-1}|)^{-1}$$

In other embodiments, a wavelength converter may include different components than those illustrated in FIG. 3B.

Figure 3C:
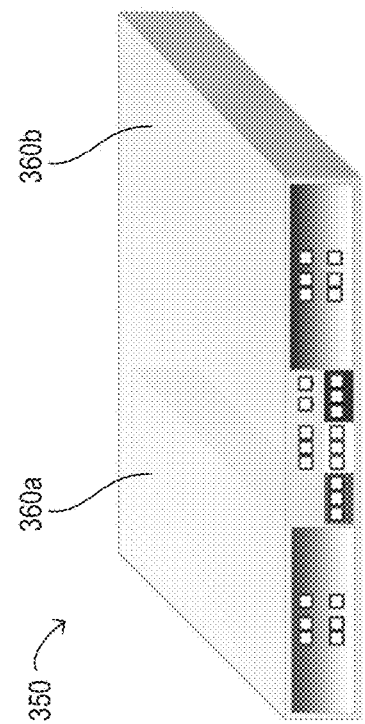
FIG. 3C illustrates an example wavelength converter device, in accordance with some embodiments.

FIG. 3C illustrates an example wavelength converter device 350 configured for wavelength converted signal generation, in accordance with some embodiments. In at least some embodiments, wavelength converter device 350 may have the ability to convert a C-Band signal into either an L-Band or an S-Band signal, or vice versa, as described herein. For example, wavelength converter device 350 may include a nonlinear medium, such as nonlinear medium 325 shown in FIG. 3B, that is selected, fabricated, or configured to receive a signal in the C-Band and, essentially, create a copy of the input optical signal, including its multiple composite wavelengths, in either the L-Band or the S-Band.

In the illustrated embodiment, a wavelength converter device 350 at a source location includes two different wavelength conversion units 360, one of which is configured to convert optical signal traffic from the C-Band to the L-Band, and one of which is configured to convert optical signal traffic from the C-Band to the S-Band. A complimentary wavelength converter device at a destination location may be configured to reverse the conversion performed by wavelength converter device 350. For example, the wavelength converter device at the destination location may convert optical signal traffic from the L-Band or S-Band back to the C-Band.

Other wavelength conversions are possible, in other embodiments. In general, a wavelength converter device 350 may be configured to convert optical signal traffic between any two of the C-Band, the S-Band, and the L-Band, in different embodiments. In one embodiment, a wavelength converter device 350 may be configured to convert optical signal traffic on a primary path between source and destination locations from the L-Band to the C-Band in response to a fiber cut or other fiber failure on the primary path.

Figure 4:
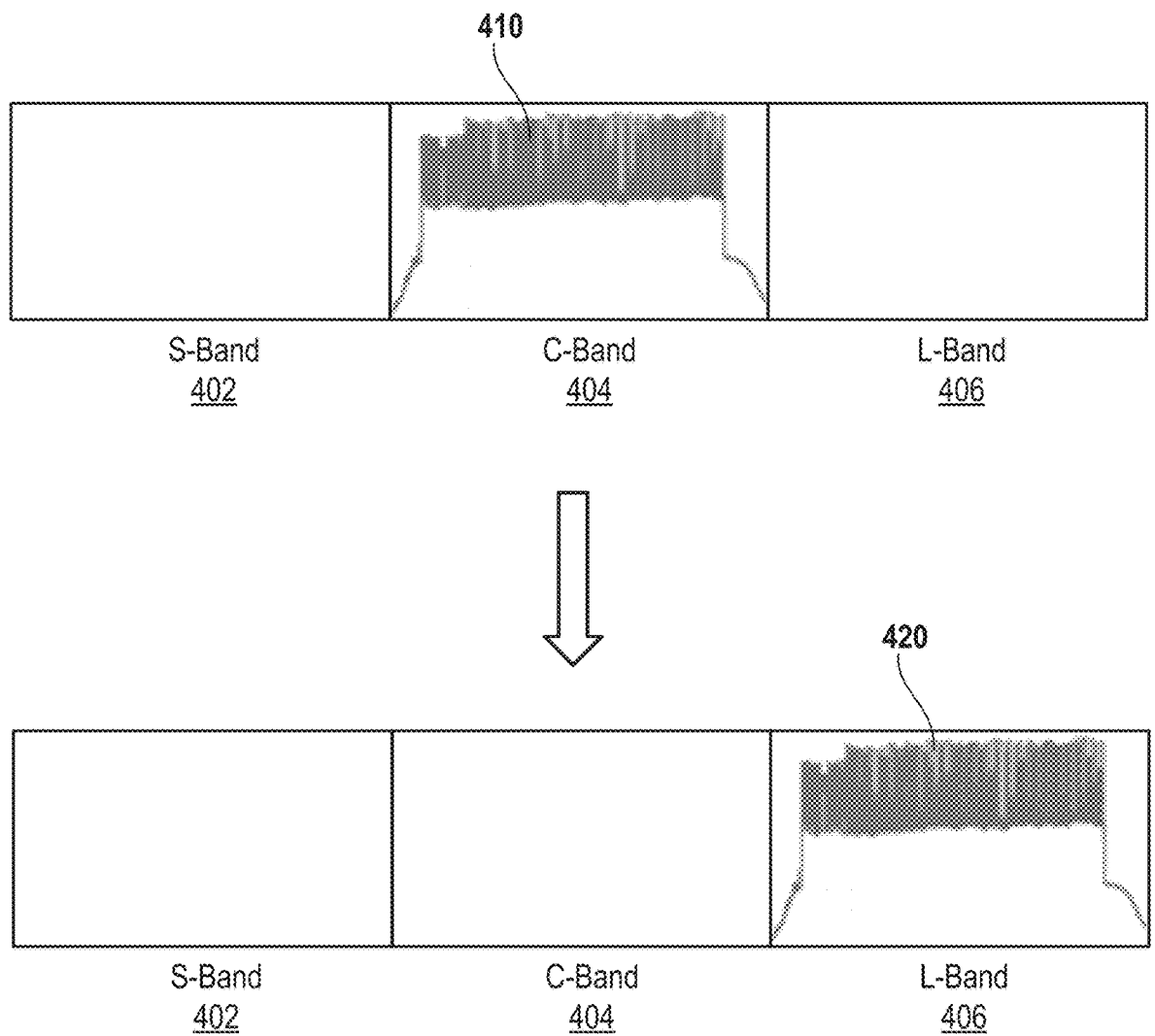
FIG. 4 illustrates an example wavelength conversion, in accordance with some embodiments.

FIG. 4 illustrates an example wavelength conversion, in accordance with some embodiments. In this example, prior to the optical signal traffic 410 passing through a wavelength converter, there is no activity in the S-Band, shown as 402, and no activity in the L-Band, shown as 406. Optical signal traffic 410 represents a multiplexed collection of optical signals each generated by a corresponding transponder and each having a respective wavelength within the C-Band. More specifically, optical signal traffic 410 includes 96 discrete wavelengths that form a spectrum pattern. In this example, optical signal traffic 410 passes through the wavelength converter, as represented in FIG. 4 by the downward arrow, thus creating an exact copy of the spectrum pattern formed by the input optical signal traffic 410, shown as optical signal traffic 420, which has been moved to the L-Band. More specifically, in the illustrated example, optical signal traffic 420 includes the same number of optical signals as optical signal traffic 410, but each of the optical signals in optical signal traffic 420 has a wavelength within the L-Band rather than a wavelength within the C-Band. In the illustrated example, subsequent to the optical signal traffic 410 passing through the wavelength converter, there is no activity in the S-Band, shown as 402, and no activity in the C-Band, shown as 404.

Figure 5:
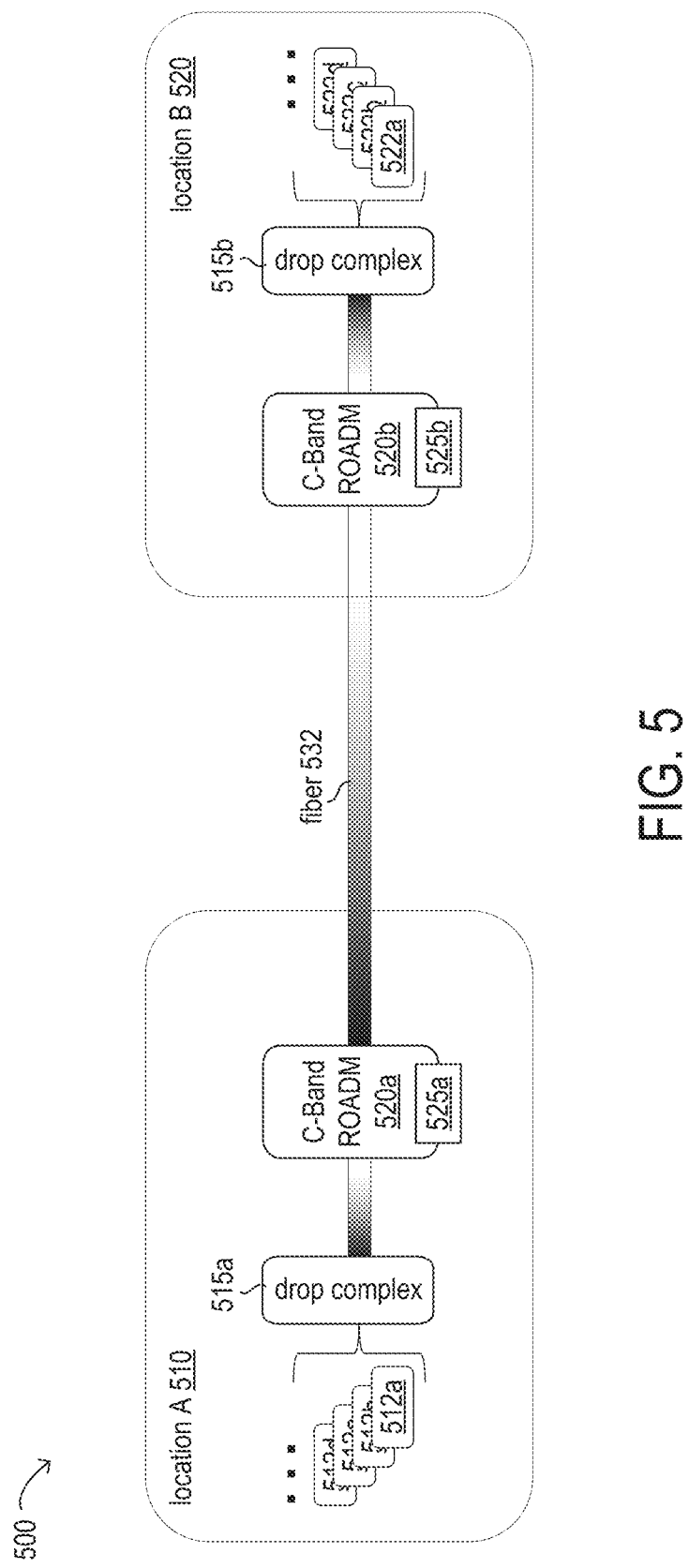
FIG. 5 is a block diagram illustrating selected elements of an optical transport network including a fiber cable between a pair of locations, in accordance with some embodiments.

FIG. 5 is a block diagram illustrating selected elements of an optical transport network 500 including a fiber cable between a pair of locations for point-to-point optical signal traffic, in accordance with some embodiments. In the illustrated embodiment, optical transport network 500 includes, at location A (510), multiple transponders 512, a drop complex 515a, and a ROADM 520a that includes a band expansion port 525a. Optical transport network 500 also includes, at location B (520), multiple transponders 522, a drop complex 515b, and a ROADM 520b that includes a band expansion port 525b.

In this example embodiment, optical signal traffic may be exchanged between the transponders 512 at location A (510) and the transponders 522 at location B (220) over fiber 532, which is coupled to ROADM 520a and ROADM 520b. At certain times and under certain circumstances, one or both of the ROADMs 520 may be configured to add and/or drop optical signals (for example at individual wavelengths) received by the ROADM 520 or to be transmitted over fiber 532. The optical signals that ultimately pass through ROADM 520a may travel along fiber 532 to ROADM 502b, and vice versa. Each of the transponders 512 and transponders 522 may be configured to generate and/or receive optical signals having a respective one of the wavelengths defined within a first predefined optical wavelength band (e.g., within the C-Band), at various times. In other embodiments, there may be separate optical transmitters and receivers at each of location A (510) and location B (520) for each such wavelength. In this example, because there are 96 wavelengths defined within the C-Band, there may be 96 transponders 512, i.e., one transponder 512 for each wavelength within the C-Band, that collectively generate optical signal traffic for transmission over fiber 532, and 96 transponders 522 that collectively receive optical signal traffic generated by transponders 512 over fiber 532.

In FIG. 5, the outputs of the transponders 512 are input to drop complex 515a, the output of which is optical signal traffic containing all 96 wavelengths of the C-Band. As described in more detail herein, in some embodiments, drop complex 515a may, during a defragmentation operation, be configured to route optical signals received from the collection of transponders 512 and having particular wavelengths to a second ROADM at location A (510) (not shown in FIG. 5) to prevent the migration of those optical signals to different channels from interfering with the exchange of optical signal traffic between location A (510) and location B (520) that would otherwise be unaffected by the defragmentation operation. During the defragmentation operation, optical signals having wavelengths within the L-Band and corresponding to the optical signals routed to the second ROADM at location A (510) may be input to ROADM 520a through band expansion port 525. In FIG. 5, which may represent the state of optical transport network 500 prior to the performance of a defragmentation operation, all of the optical signal traffic output by drop complex 515a is provided to ROADM 520a and is transmitted over fiber 532 to ROADM 520b at location B (520). The optical signal traffic received by ROADM 520b at location B (520) over fiber 532 is input to drop complex 515b, which may demultiplex the received optical signal traffic into the 96 wavelengths of the C-Band, each of which is provided to a respective one of the 96 transponders 522.

Figure 6:
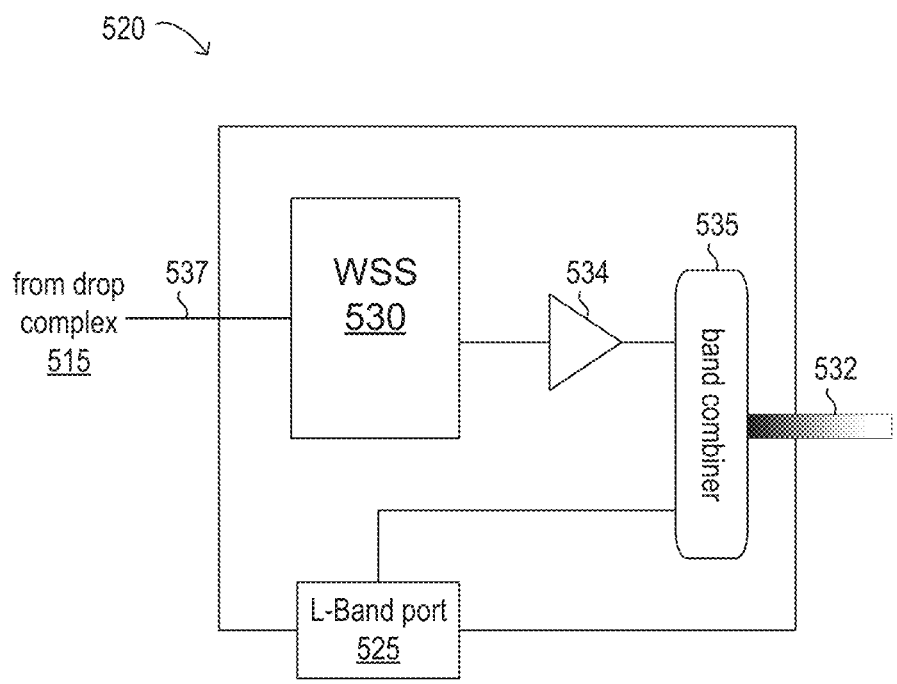
FIG. 6 is a block diagram illustrating selected elements of a ROADM component including a band expansion port that allows insertion of optical signal traffic from another optical wavelength band, in accordance with some embodiments.

FIG. 6 is a block diagram illustrating selected elements of a ROADM component 520 including a band expansion port 525 that allows insertion of optical signal traffic from another optical wavelength band, such as the L-Band, in accordance with some embodiments. In the illustrated embodiment, ROADM 520 may be configured to receive, from a drop complex 515 over optical communication interface 537, and process optical signal traffic having wavelengths within a particular predefined optical wavelength band, in this case, the C-Band. In the illustrated embodiment, the band expansion port 525 is configured to receive optical signals having wavelengths within a different predefined optical wavelength band, in this case, the L-Band. In other embodiments, ROADM 520 may be configured to process optical signal traffic having wavelengths within a predefined optical wavelength band other than the C-Band, such as the L-Band or the S-Band, and band expansion port 525 may be configured to receive optical signals having wavelengths within an alternate predefined optical wavelength band.

As illustrated in FIG. 6, each ROADM 520 may include a wavelength selective switch, shown as WSS 530, configured to add or drop individual wavelengths or multiple wavelengths in the optical domain, an amplifier 534, and a band combiner 535. Band combiner 535 may be configured to combine optical signals having wavelengths within the C-Band, which are received from WSS 530 through amplifier 534, with optical signals having wavelengths within the L-Band which, if present, are received through L-Band port 525 for transmission over fiber 532. As described in more detail herein, when the optical transport network 200 is operating normally and is not performing a defragmentation operation, all optical signal traffic may be input to ROADM 520 as optical signals having wavelengths within the C-Band and received from drop complex 515 over optical communication interface 537. However, during a defragmentation operation, a portion of the optical signal traffic input to ROADM 520 may be input as optical signals having wavelengths within the L-Band and received from a wavelength converter (not shown in FIG. 6) via L-Band port 525.

Figure 7:
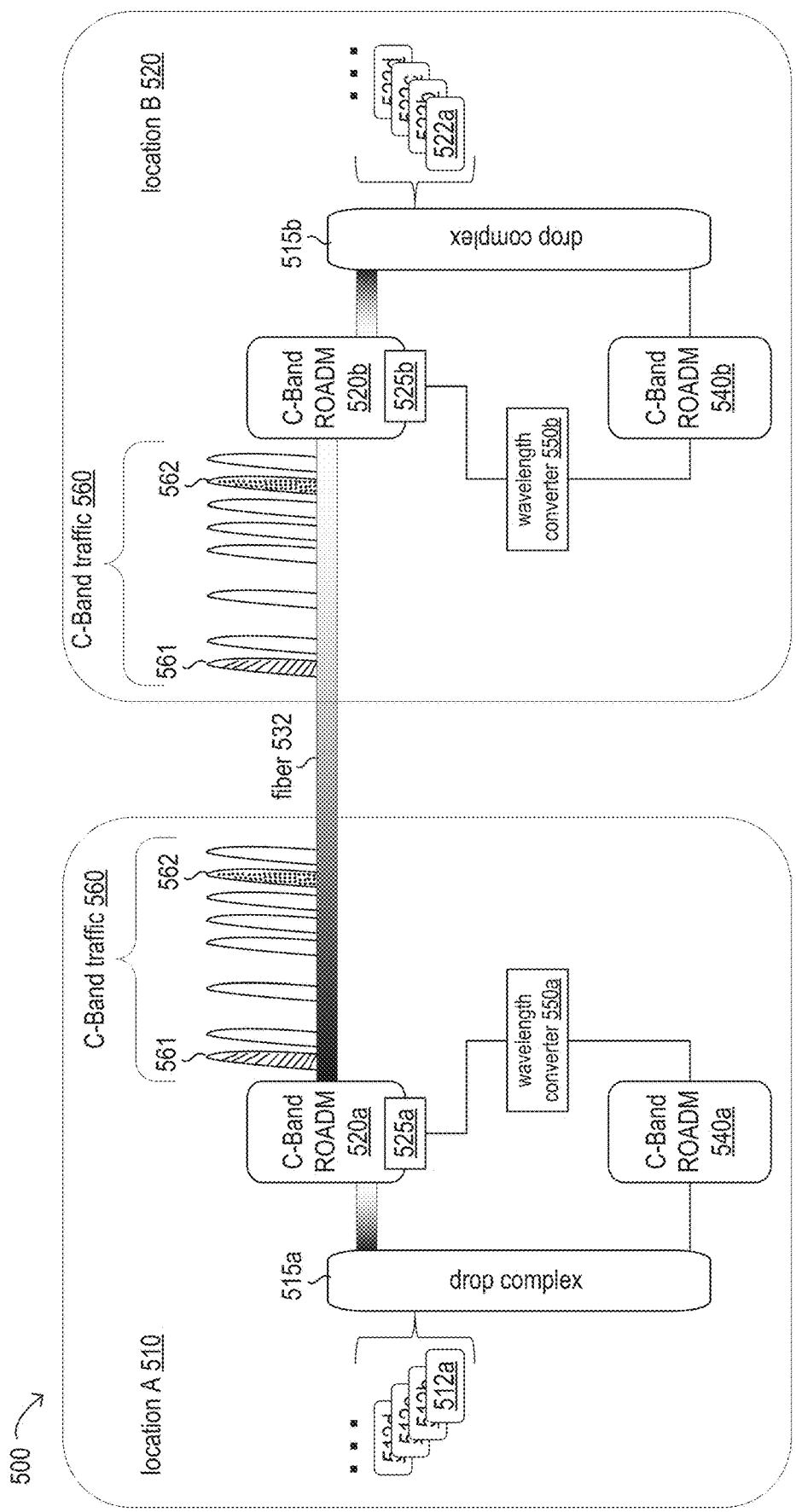
FIG. 7 is a block diagram illustrating selected elements of the optical transport network illustrated in FIG. 5 with the addition of two ROADM components and two wavelength converters, in accordance with some embodiments.

In at least some embodiments, to support in-service defragmentation in optical transport network 500 using wavelength conversion, as described herein, a new degree may be added to the C-Band ROADM 520 at each location and respective alternate paths for optical signal traffic passing through a node at location A (210) that uses the L-Band or a node at location B (220) that uses the L-Band may be established. For example, FIG. 7 is a block diagram illustrating selected elements of the optical transport network 500 illustrated in FIG. 5 with the addition of two ROADM components and two wavelength converters, in accordance with some embodiments. More specifically, an additional ROADM 540*a* and a wavelength converter 550*a* have been added at location A (510), and an additional ROADM 540*b* and a wavelength converter 550*b* have been added at location B (520). At each location, the line side of the ROADM 540 is coupled to the wavelength converter 550, the opposite side of the ROADM 540 is coupled to the drop complex 515, and the wavelength converter 550 is coupled to the band expansion port 525 on the ROADM 520 to create a respective alternate optical signal path. Note that, in some embodiments, one or both of ROADM 540*a* and ROADM 540*b* may also include a respective band expansion port (not shown in FIG. 7), but that band expansion port might not be used during normal operation of optical transport network 500 nor during defragmentation operations.

During normal operation of optical transport network 500, which is depicted in FIG. 7, all of the optical signal traffic received at drop complex 515*a* from the collection of transponders 512 is routed by drop complex 515*a* to ROADM 520*a* as optical signals having wavelengths within the C-Band and none of the optical signal traffic received at drop complex 515*a* from the collection of transponders 512 is routed by drop complex 515*a* to the alternate optical signal path that includes ROADM 540*a* and wavelength converter 550*a*. In the illustrated example, optical signals having wavelengths within the C-Band, shown as C-Band traffic 560, are output by ROADM 520*a* for transmission over fiber 532 to ROADM 520*b*. In this example, C-Band traffic 560 includes two wavelengths, shown as wavelengths 561 and 562, that are identified as wavelengths to be moved from a respective current channel to a respective alternate channel within the C-Band as part of a defragmentation operation. More specifically, wavelength 561 is identified as a wavelength to be moved to the empty channel position shown two positions to the right of its current channel, and wavelength 562 is identified as a wavelength to be moved to the empty channel position shown four positions to the left of its current channel. In this example, there are five channel positions between wavelength 561 and wavelength 562 that are currently occupied and should thus be avoided when transitioning wavelengths 561 and 562 from their respective current channels to their respective alternate channels.

As described in more detail herein, in various embodiments, optical signals having wavelengths that have been identified as wavelengths to be moved from a respective current channel to a respective alternate channel within the C-Band may, in order to avoid interference with other optical signals during their respective transitions, be routed by drop complex 515*a* to the alternate optical signal path that includes ROADM 540*a* and wavelength converter 550*a* while performing the transitions.

Figure 8:
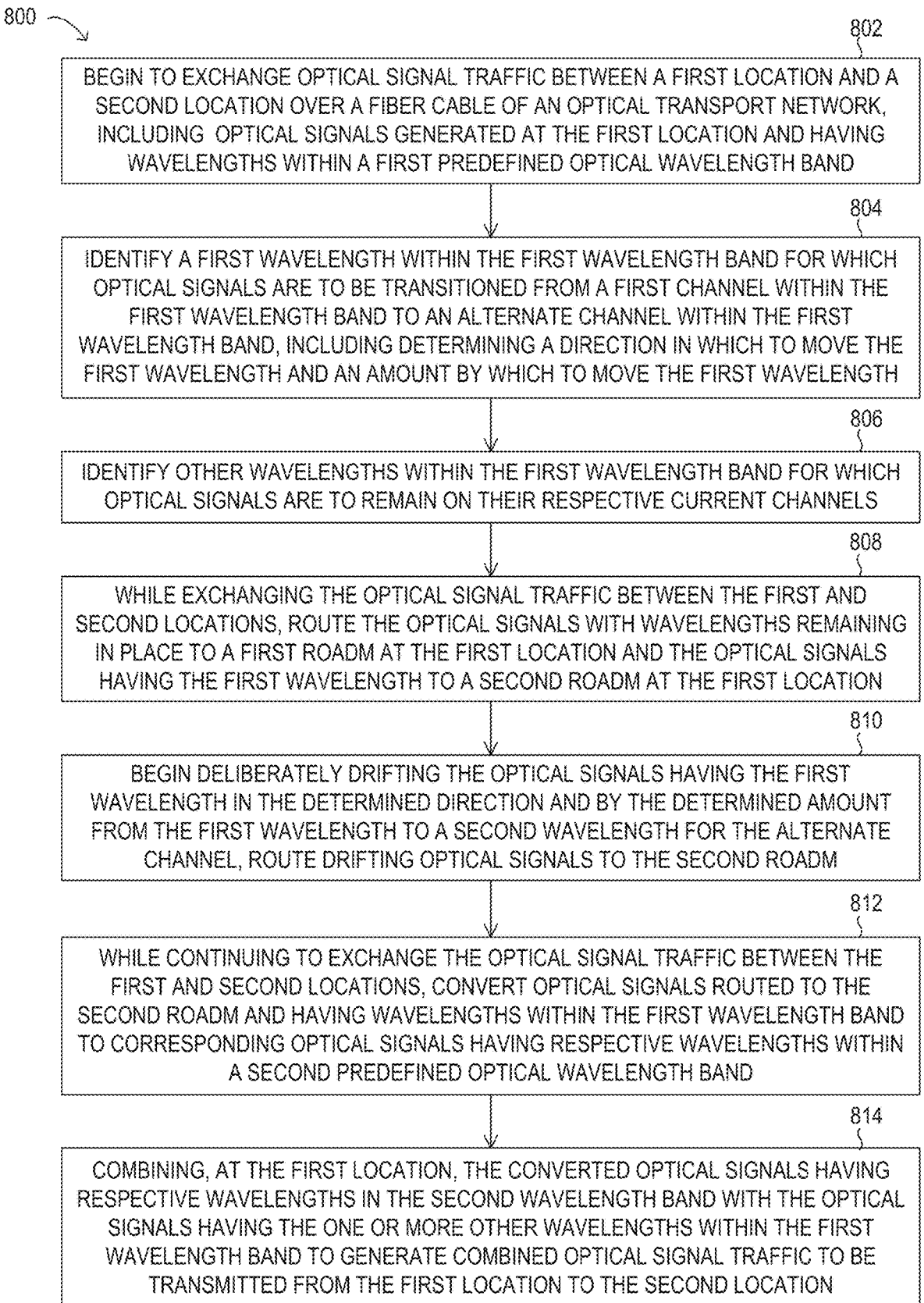
FIG. 8 is a flow chart of selected elements of a method for performing in-service defragmentation in an optical transport network using wavelength conversion, in accordance with some embodiments.

Referring now to FIG. 8, a block diagram of selected elements of an embodiment of a method 800 for performing in-service defragmentation in an optical network using wavelength conversion, as described herein, is depicted in flowchart form. In various embodiments, some or all of the operations of method 800 depicted in FIG. 8 may be performed by components of an optical network including, but not limited to, any of the components illustrated in FIGS. 1, 2A, 2B, 3B, 3C, 5, 6, 7, 9, 11, or 12. In some embodiments, at least some of the operations shown in FIG. 8 may be performed or initiated by an SDN controller or by a defragmentation controller process executing on an SDN controller. It is noted that certain operations described in method 800 may be optional or may be rearranged in different embodiments. In at least some embodiments, some or all of the operations shown in FIG. 8 may be performed while the optical transport network in service, i.e., while continuing to exchange optical signal traffic with no interruptions for optical signals having wavelengths identified as wavelengths to remain on their respective current channels, and with very little interruption for each of the optical signals having wavelengths identified as wavelengths to be moved from a respective current channel to a respective alternate channel.

Method 800 may begin, at 802, by beginning to exchange optical signal traffic between a first location and a second location over a fiber cable of an optical transport network, the optical signal traffic including optical signals generated at the first location and having wavelengths within a first one of multiple predefined optical wavelength bands. In one example, the optical signal traffic may include optical signals having wavelengths within the C-Band (e.g., between 1530 and 1565 nanometers).

At 804, the method may include identifying a first wavelength within the first predefined optical wavelength band for which optical signals are to be transitioned from a first channel within the first predefined optical wavelength band to an alternate channel within the first predefined optical wavelength band, including determining a direction in which to move the first wavelength and an amount by which to move the first wavelength.

At 806, method 800 may include identifying one or more other wavelengths within the first predefined optical wavelength band for which corresponding optical signals are to remain on their respective current channels.

At 808, the method may include, while continuing to exchange the optical signal traffic between the first location and the second location over the fiber cable, routing the optical signals having wavelengths within the first predefined optical wavelength band that have been identified as remaining on their respective current channels to a first ROADM at the first location and routing the optical signals having the first wavelength within the first predefined optical wavelength band to a second ROADM at the first location, as described above. For example, the first wavelength may be reassigned to the alternate optical signal path at the first location. In addition, the first wavelength may be reassigned to the alternate optical signal path at the second location simultaneously with the reassignment of the first wavelength to the alternate optical signal path at the first location.

At 810, method 800 may include beginning to deliberately drift the optical signals having the first wavelength in the determined direction and by the determined amount from the first wavelength within the first predefined optical wavelength band to a second wavelength within the first predefined optical wavelength band corresponding to the first alternate channel and routing the drifting optical signals to the second ROADM.

At 812, the method may include, while continuing to exchange the optical signal traffic between the first and second locations, converting, at the first location, optical signals routed to the second ROADM and having wavelengths within the first predefined optical wavelength band to corresponding optical signals having respective wavelengths within a second one of the multiple predefined optical wavelength bands. For example, the first wavelength may be converted a corresponding wavelength within the L-Band (e.g., between 1565 and 1625 nanometers).

At 814, method 800 may include combining, at the first location, the converted optical signals having respective wavelengths within the second predefined optical wavelength band with the optical signals having the one or more other wavelengths within the first predefined optical wavelength band to generate combined optical signal traffic to be transmitted from the first location to the second location over the fiber cable.

While FIG. 8 illustrates an example embodiment in which the first predefined optical wavelength band is the C-Band and the second predefined optical wavelength band is the L-Band, in other embodiments, one or more of the first and second predefined optical wavelength bands may be different than in this example embodiment. For example, in some embodiments, the first predefined optical wavelength band may be the C-Band and the second predefined optical wavelength band may be the S-Band. In another example, the first predefined optical wavelength band may be the L-Band and the second predefined optical wavelength band may be the C-Band. In general, the multiple predefined optical wavelength bands may include two or more of the C-Band, comprising wavelengths between 1530 and 1565 nanometers, the L-Band, comprising wavelengths between 1565 and 1625 nanometers, and the S-Band, comprising wavelengths between 1460 and 1530 nanometers, in various embodiments.

As noted above in reference to FIG. 7, wavelength 561 has been identified as a wavelength to be moved to the empty channel position shown two positions to the right of its current channel, wavelength 562 has been identified as a wavelength to be moved to the empty channel position shown four positions to the left of its current channel, and there are five channel positions between wavelength 561 and wavelength 562 that are currently occupied and should thus be avoided when transitioning wavelengths 561 and 562 from their respective current channels to their respective alternate channels. In this example, wavelengths 561 and 562 may be routed by drop complex 515a to the alternate optical signal path that includes ROADM 540a and wavelength converter 550a during the transitions of these wavelengths to their respective alternate channels. In some embodiments, an SDN controller in a management plane for optical transport network 500 may issue to drop complex 515a and to drop complex 515b, for each of wavelengths 561 and 562, a respective command to cause drop complex 515a and drop complex 515b to reassign these wavelengths to the respective alternate optical signal paths at location A (510) and at location B (520). While these commands may be issued substantially simultaneously, they might not be perfectly synchronized. Therefore, in some embodiments, there may be a very brief loss of traffic for the optical signals at these wavelengths (e.g., on the order of less than one second) when performing the reassignments.

Figure 9:
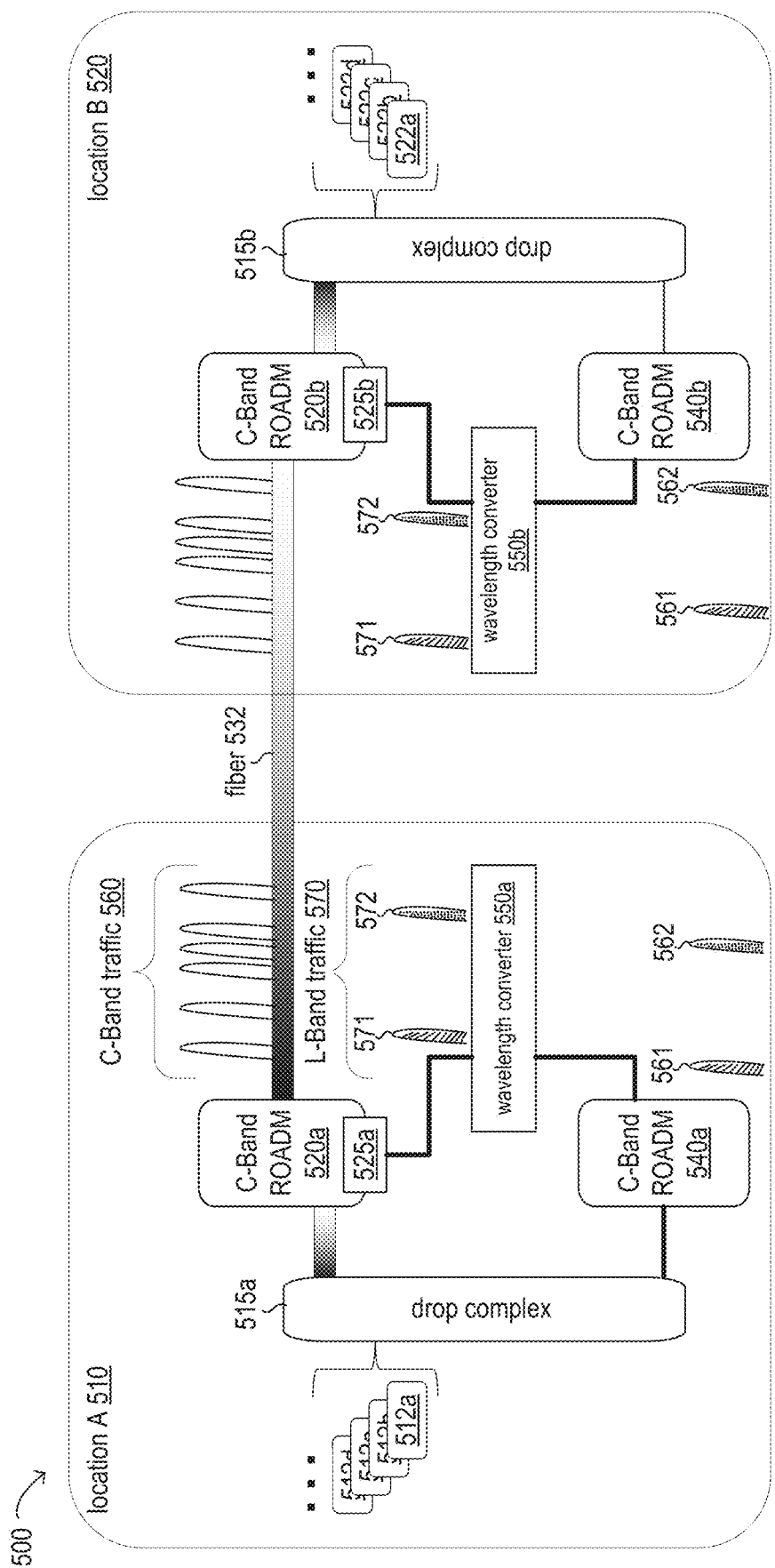
FIG. 9 is a block diagram illustrating selected elements of the optical transport network illustrated in FIG. 7 following a reassignment of multiple wavelengths to an alternate optical signal path at the same ROADM site for processing in second optical wavelength band, in accordance with some embodiments.

FIG. 9 is a block diagram illustrating selected elements of the optical transport network 500 illustrated in FIG. 8 following a reassignment of multiple wavelengths to an alternate optical signal path at the same ROADM site for processing in a second optical wavelength band, in accordance with some embodiments. More specifically, FIG. 9 illustrates the state of optical transport network 500 following the reassignment, at location A (520) and at location B (520), of wavelengths 561 and 562 from an optical signal path from a respective drop complex 515 to a respective ROADM 520 used during normal operation of the optical transport network 500 to an alternate optical signal paths that includes a respective ROADM 540 and a respective wavelength converter 550 used during defragmentation operations.

As shown in FIG. 9, the optical signals within the optical signal traffic received from the collection of transponders 512 and having wavelengths 561 and 562 in the C-Band may be routed by drop complex 515a to ROADM 540a, where they are aggregated together. Subsequently, these optical signals may be provided to wavelength converter 550a and converted to corresponding optical signals having wavelengths 571 and 572, respectively, in the L-Band.

These converted optical signals are shown in FIG. 9 as L-Band traffic 570. These converted optical signals may then be provided to ROADM 520a at band expansion port 525a. In the example illustrated in FIG. 9, the remaining optical signals within the optical signal traffic received from the collection of transponders 512 and having wavelengths within the C-Band other than wavelengths 561 and 562 may be routed by drop complex 515a to ROADM 520a. A band combiner within ROADM 520a, such as band combiner 535 illustrated in FIG. 6 (not shown in FIG. 9), may combine C-Band traffic 560, which no longer includes wavelengths 561 and 571, and L-Band traffic 570, which includes converted versions of wavelengths 561 and 571, for transmission to location B (520) over fiber 532.

Once the optical signals having the identified wavelengths 561 and 562 have been reassigned to the alternate optical signal path at location A (510) and converted to corresponding optical signals 571 and 572 having wavelengths within the L-Band, the optical signals having wavelengths 571 and 572 in the L-Band may be transitioned to alternate channels in the L-Band that correspond to their destination channels in the C-Band without interfering with the remaining optical signals having wavelengths within the C-Band that continue to be exchanged between location A (510) and location B (520) over fiber 532.

In the optical transport networks described herein, transponders 512 and 522 may be modern transponders capable of tuning to any of the C-Band wavelengths and may also be capable of performing incremental wavelength adjustments while in use. In at least some embodiments, these capabilities may be used to deliberately and slowly drift the wavelengths that are identified as wavelengths to be transitioned from their respective current channels in the C-Band to their respective alternate channels in the C-Band on the transponders 512 at location A (510) and the transponders 522 at location B (520) that were tuned to the wavelengths 561 and 562. In embodiments in which it is determined that two or more identified wavelengths will not cross each other during their transitions, as is the case in this example, the identified wavelengths may be drifted substantially in parallel. For example, the wavelength transitions for wavelength 561 and 562 may be initiated simultaneously. However, because the transition of wavelength 562 will take longer than the transition of wavelength 561, due the fact that wavelength 562 has farther to move than does wavelength 561, the two wavelength transitions will, at first, be performed in parallel, but will not complete at the same time.

FIGS. 10A-10D illustrate the transition of the two wavelengths from their respective original channels within the L-Band to respective alternate channels within the L-Band, in accordance with some embodiments. More specifically, FIG. 10A illustrates the original C-Band traffic 560 prior to any wavelength transitions. The original C-Band traffic 560 includes the two wavelengths 561 and 562 to be transitioned from their current channels with the C-Band to alternate channels shown as 563 and 564, respectively. In this example, the transitions of these wavelengths will not cross each other while drifting. Therefore, they can be transitioned substantially in parallel.

FIG. 10B illustrates L-Band traffic 570 following the conversion of the optical signals having wavelengths 561 and 562 in the C-Band to corresponding optical signals having wavelengths 571 and 572 in the L-Band, as described above, prior to beginning to deliberately drift these wavelengths toward their respective destination channels. In at least some embodiments, at this point, optical signal traffic including C-Band traffic 560 and L-Band traffic 570 continues to be exchanged over fiber 532. As shown in FIGS. 10A and 10B, the destination channels for wavelengths 561 and 562 in the C-Band, shown as destination channels 563 and 564, may correspond to destination channels 572 and 574, respectively, for wavelengths 571 and 572 in the L-B and.

In at least some embodiments, while transponders 512 slowly and deliberately drift wavelengths 561 and 562 in the C-Band, the optical signals having these drifting wavelengths within the C-Band are routed by drop complex 515a to ROADM 540a, after which they are provided to wavelength converter 550a. The wavelengths, in the L-Band, of the optical signals output by wavelength converter 550a during the drifting of the wavelengths within the C-Band may thus be drifted by the same amount as their C-Band counterparts. FIG. 10C illustrates L-Band traffic 570 while this drifting is in progress, As illustrated, the converted optical signals previously having wavelengths 571 and 572 have, by this point, been drifted to wavelengths shown as 575 and 576, respectively, but they have not yet reached their destination channels, shown as 573 and 574, respectively. In at least some embodiments, during the drifting, optical signal traffic including C-Band traffic 560 and L-Band traffic 570 continues to be exchanged over fiber 532. FIG. 10D illustrates L-Band traffic 570 once the drifting is complete.

As noted above, identifying a wavelength to be transitioned from a current channel within a predefined optical wavelength band to an alternate channel within the predefined optical wavelength band may include determining a direction in which to move the wavelength and an amount by which to move the wavelength to reach the alternate channel. In at least some embodiments, moving a wavelength from a current channel to an alternate channel may include slowly drifting the wavelength by performing a series of incremental adjustments to the wavelength in the predetermined direction that collectively transition the wavelength by the predetermined amount. This may include, for example, an SDN controller issuing, while the transponders are in use and for each transitioning wavelength, a series of individual commands to one or more transmitting transponders 512 at location A (510) and one or more receiving transponders 522 at location B (520), each command instructing the transponders to perform an incremental wavelength adjustment in the predetermined direction for the transition, such that the transponders at the two location are adjusted in lock step. The SDN controller may, for each transitioning wavelength, continue issuing the commands until the wavelength has been moved by the predetermined amount and has reached its respective alternate channel. In at least some embodiments, by drifting the wavelengths slowly, the transponders may be able to continue exchanging optical signal traffic during the drifting without losing traffic. In some embodiments, the transitioning wavelengths may be adjusted in increments on the order of one nanometer. In other embodiments, the transitioning wavelengths may be adjusted in smaller or larger increments. However, if the transitioning wavelengths are adjusted too quickly, the receiving transponders at location B (520) might not be able to remain locked to the received signal, causing a traffic outage. Making the incremental adjustments at both location a (510) and location B (520) further supports bidirectional transmission in the optical transport network. Because the transitioning wavelengths have been moved to the L-Band, the drifting will not affect the wavelengths that remain on the C-Band.

Figure 11:
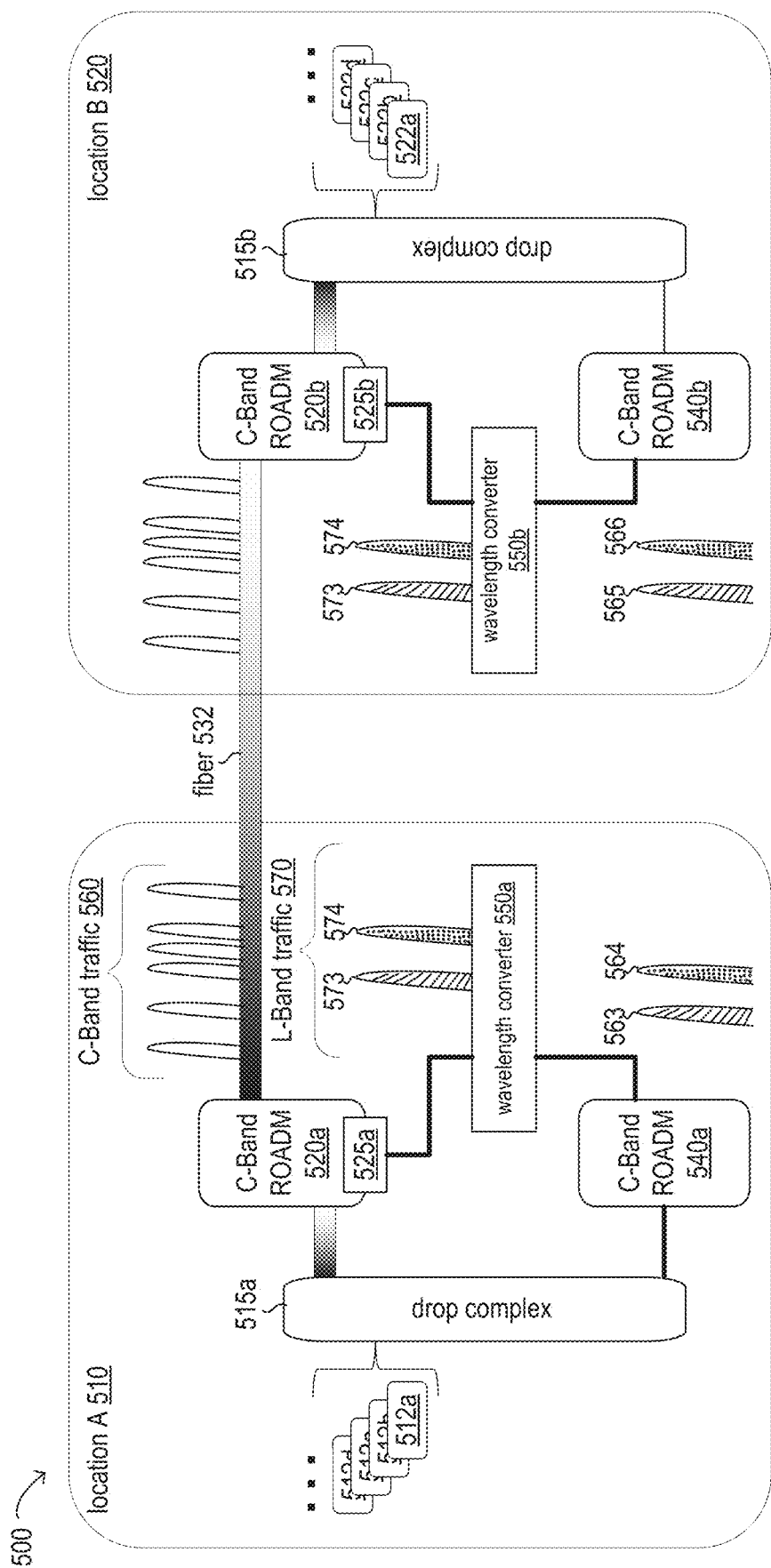
FIG. 11 is a block diagram illustrating selected elements of the optical transport network illustrated in FIGS. 7 and 9 following the transition of the two wavelengths to their respective alternate channels within the second optical wavelength band, in accordance with some embodiments.

FIG. 11 is a block diagram illustrating selected elements of the optical transport network 500 illustrated in FIGS. 8 and 9 following the transition of the two wavelengths to their respective alternate channels within the second optical wavelength band, in accordance with some embodiments. More specifically, the optical signals that previously had wavelengths 561 and 562 in the C-Band have been drifted to wavelengths 563 and 564 in the C-Band, corresponding to their respective alternate channels, and the converted optical signals that previously had wavelengths 571 and 572 in the L-Band have been drifted to wavelengths 573 and 574 in the L-Band. In at least some embodiments, at this point, optical signal traffic including C-Band traffic 560 and L-Band traffic 570 continues to be transmitted over fiber 532. FIG. 10D illustrates L-Band traffic 570 once the drifting is complete.

Once the drifting is complete and the optical signals that previously had wavelengths 561 and 562 in the C-Band have been drifted to their respective alternate channels, the respective drop complex 515 at each of location A (510) and location B (520) may be configured to route the optical signals having the alternate wavelengths 563 and 564 to the normal optical signal path through ROADM 520a and ROADM 520b, respectively, rather than to the alternate optical signals paths that include ROADMs 540 and wavelength converters 550. In other words, optical transport network 500 may return to operation with all optical single traffic being exchanged in the C-Band. In some embodiments, an SDN controller in a management plane for optical transport network 500 may issue to drop complex 515a and to drop complex 515b, for each of wavelengths 563 and 564, a respective command to cause drop complex 515a and drop complex 515b to reassign these wavelengths to the normal optical signal paths at location A (510) and at location B (520) that include ROADM 520a and ROADM 520b, respectively. While these commands may be issued substantially simultaneously, they might not be perfectly synchronized. Therefore, in some embodiments, there may be a very brief loss of traffic for the optical signals at these wavelengths (e.g., on the order of less than one second) when performing the reassignments.

Figure 12:
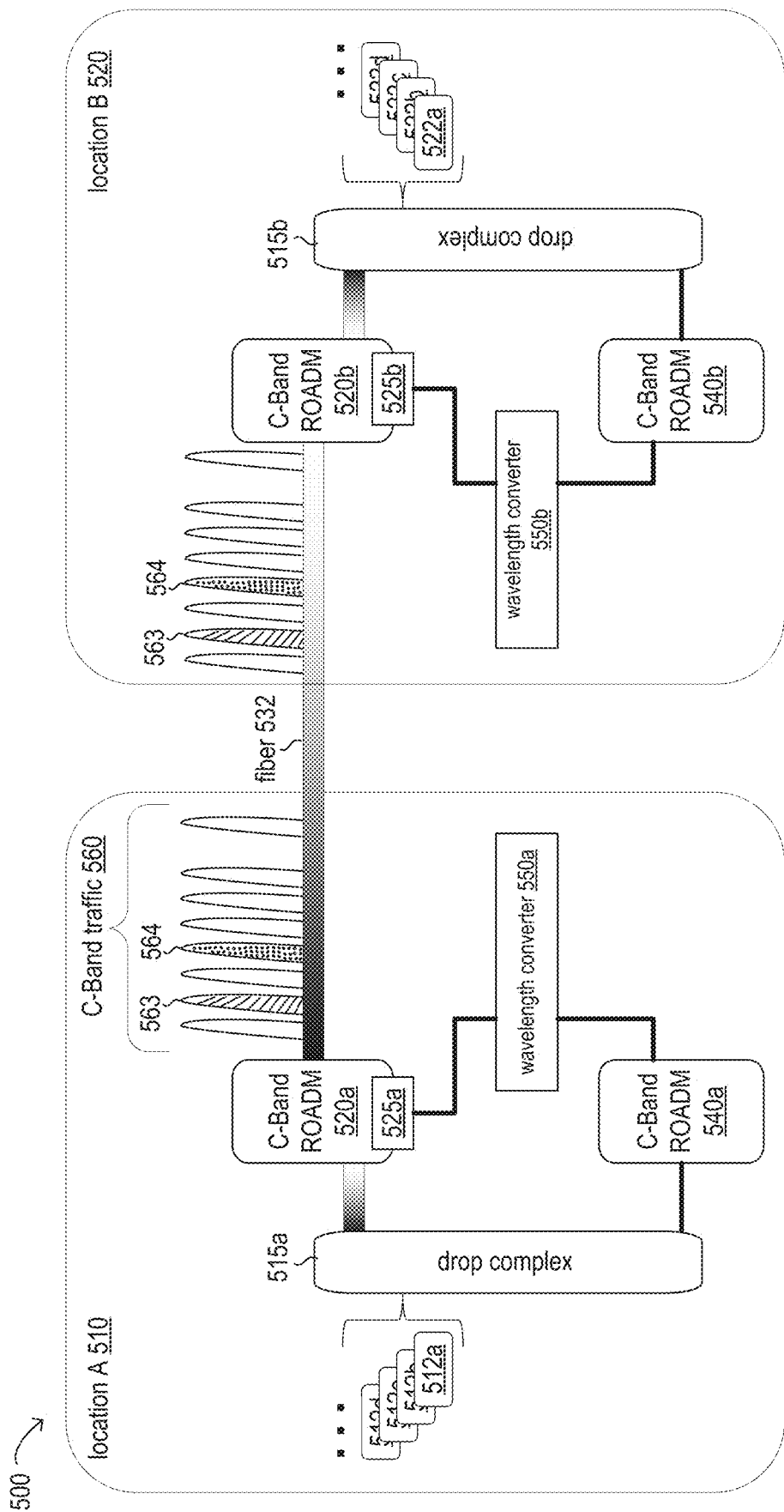
FIG. 12 is a block diagram illustrating selected elements of the optical transport network illustrated in FIGS. 7, 9, and 11 following the reassignment of the two transitioned wavelengths to the normal optical signal path for operation in the first optical wavelength band, in accordance with some embodiments.

FIG. 12 is a block diagram illustrating selected elements of the optical transport network 500 illustrated in FIGS. 8, 9, and 11 following the reassignment of the transitioned wavelengths 563 and 564 back to the normal optical signal path for normal operation in the C-Band, in accordance with some embodiments. After returning to the normal operation of optical transport network 500, as depicted in FIG. 12, all of the optical signal traffic received at drop complex 515a from the collection of transponders 512 is routed by drop complex 515a to ROADM 520a as optical signals having wavelengths within the C-Band and none of the optical signal traffic received at drop complex 515a from the collection of transponders 512 is routed by drop complex 515a to the alternate optical signal path that includes ROADM 540a and wavelength converter 550a. In the illustrated example, optical signals having wavelengths within the C-Band, shown as C-Band traffic 560, are output by ROADM 520a for transmission over fiber 532 to ROADM 520b. In this example, C-Band traffic 560 includes two new wavelengths, shown as wavelengths 563 and 564, and no longer includes wavelengths 561 and 562.

In various embodiments, after identifying all the wavelengths requiring a transition to another channel number, any of a variety of approaches may be applied to attempt to optimize the movement of wavelengths between channels while ensuring that optical signals having wavelengths in transition do not cross each other as their wavelengths are drifted to their destination channels. In some embodiments, the simplest approach may involve transitioning each of the identified wavelengths separately, i.e., one at a time. With this approach there would be no risk of cross-talk interference between two channels during drifting. However, this approach may require a much longer time window than approaches in which multiple wavelength transitions are performed substantially in parallel.

In some embodiments, wavelengths identified as requiring transitions may be placed into multiple non-overlapping groupings, each of which includes wavelengths for which the required transitions will not interfere with each other, using any of a variety of suitable sorting approaches. For example, if 40 of the 96 channels in the C-Band are identified as requiring a transition, it may be possible to sort the 40 channels into multiple subsets in which all of the channels in the subset can be transitioned together. In some embodiments, the sorting approach may aim to group the wavelengths such that the complete set of identified wavelength transitions is performed as efficiently as possible. In other embodiments, it might not be necessary to sort the wavelengths into groupings that guarantee the shortest possible defragmentation operation.

In one example, a first identified wavelength to be included in a given wavelength transition grouping may be selected randomly from among the identified wavelengths, after which a search may be performed to identify other identified wavelengths to include in the given grouping such that, during drifting, the identified wavelengths in the given grouping would not cross each other and could be moved at the same time. In another example, the identified wavelengths may be sorted in order from the wavelength associated with the shortest move to the wavelength associated with the longest move. In this example, either the wavelength associated with the shortest move or the wavelength associated with the longest move may be selected for inclusion in a given wavelength grouping first, after which the ordered list of identified wavelengths may be traversed to identify other wavelengths to include in the given grouping such that, during drifting, the identified wavelengths in the given grouping would not cross each other and could be moved at the same time. In either of these examples, once there are no additional identified wavelengths that can be added to a first grouping, a first identified wavelength to be included in a second grouping may be selected from among the identified wavelengths that remain ungrouped, after which a search for other members of the second grouping may be performed, and so on until all of the identified wavelengths are included in a respective grouping.

In general, any of a variety of methods may be used to define or identify groups of wavelength transitions that can be performed substantially in parallel. For example, these wavelength transitions may be initiated simultaneously but, due to the fact that some wavelengths require longer moves than others, might not complete at the same time. In some embodiments, such methods may be described in terms of the following pseudocode steps:

1. Identify all wavelengths requiring transition and create an ordered list of dyads in which each dyad includes an element representing the source wavelength for a particular transition and an element representing the destination wavelength for the particular transition. In one example, it may be assumed that there are N wavelengths requiring transition and their corresponding dyads may be labeled as $(O_i, D_i)$, where $O_i$ represents the origin channel number and $D_i$ represents the destination channel number for the $i^{th}$ wavelength requiring a transition.
2. Assign each of the wavelength transitions to one of two transition sets: a first transition set in which the wavelength is transitioning to a higher channel number (e.g., Destination Channel Number $D_i$>Origin Channel Number $O_i$), and a second transition set in which the wavelength is transitioning to a lower channel number (e.g., Destination Channel Number $D_i$<Origin Channel Number $O_i$).
3. Determine, for different combinations of wavelength transitions represented in the first set, whether the transitions can be performed substantially in parallel. For example, for the first transition set, in which the wavelengths are transitioning to higher channel numbers, and for each pair of wavelength transitions $(O_1, D_1)$ and $(O_2, D_2)$ where $O_1<D_1$ and $O_2<D_2$, the two wavelengths can be transitioned at the same time if they meet the following criteria:
   a. If the two transitions do not overlap, they can be performed substantially in parallel. The mathematical criteria for this condition is: $D_1<O_2$.
   b. If the transitions do overlap, the following must apply in order to perform the transitions substantially in parallel: $(D_1-O_1)<(D_2-O_2)$, where $D_1<D_2$. Meeting this condition ensures that the two wavelengths will not catch up to each other during the transition (e.g., during drifting).
4. Determine, for different combinations of wavelength transitions represented in the second set, whether the transitions can be performed substantially in parallel. For example, for the second transition set, in which the wavelengths are transitioning to lower channel numbers, and for each pair of wavelength transitions $(O_1, D_1)$ and $(O_2, D_2)$ where $O_1>D_1$ and $O_2>D_2$, the two wavelengths can be transitioned at the same time if they meet the following criteria:
   a. If two transitions do not overlap, they can be performed substantially in parallel. The mathematical criteria for this condition is: $D_1>O_2$.
   b. If the transitions do overlap, the following must apply in order to perform the transitions substantially in parallel: $(O_1-D_1)<(O_2-D_2)$ where $D_1>D_2$. Meeting this condition ensures that the two wavelengths will not catch up to each other during the transition (e.g., during drifting).

This approach to grouping wavelengths that can be transitioned substantially in parallel may be further illustrated by way of the following example. In this example, the five wavelength transitions depicted in Table 1 below represent transitions to a higher channel number.

TABLE 1

| Transition Number | Origin Channel | Destination Channel |
|---|---|---|
| 1 | 6 | 18 |
| 2 | 3 | 7 |
| 3 | 40 | 51 |
| 4 | 5 | 6 |
| 5 | 30 | 38 |

In this example, Transitions 1, 3 and 5 do not overlap and can be performed in a single transition operation for a grouping that includes these three transitions. This leaves the Transitions 2 and 4 for further consideration. Transition 2 overlaps Transition 1 and thus warrants a closer inspection. In this case, the two origin wavelengths will drift towards their destination wavelengths, with Transition 1 migrating a wavelength from channel 6 to channel 7 while Transition 2 migrates a wavelength from channel 3 to channel 4. As a second step, Transition 1 migrates from channel 7 to channel 8 while Transition 2 migrates from channel 4 to channel 5, and so on. If these transitions are performed in parallel, the two wavelengths will never cross each other since they remain equidistant from each other while drifting in the same direction. In addition, by the time Transition 2 completes its transition to channel 7, the wavelength associated with Transition 1 will be at channel 10 and will continue to migrate toward channel 18. Therefore, Transition 2 can be performed in the same grouping as Transitions 1, 3 and 5. This result can also be determined using the mathematical condition stated earlier, $(D_1-O_1)<(D_2-O_2)$, which in this case becomes $(7-3)<(18-6)$.

In this example, Transition 4 migrates a wavelength from channel 5 to channel 6 in a single transition, after which the wavelength remains at channel 6. This transition would block Transition 2, which requires a transition from channel 3 to 7. In other words, if Transition 2 and Transition 4 were performed, or initiated, at the same time, Transition 2 would not be able to migrate through channel 6 due to the fact that channel 6 will be occupied by the wavelength associated with Transition 4. Therefore, Transition 4 cannot be performed in the same grouping as Transitions 1, 2, 3 and 5. The result of this exercise shows that the set of wavelength transitions listed in Table 1 can be performed in two separate steps. For example, Transitions 1, 2, 3, and 5 may be performed in a first step and Transition 4 may be performed in a second step after all of Transitions 1, 2, 3, and 5 are completed. It is noted, however, that this is not the only valid set of wavelength transition groupings for the wavelength transitions depicted in Table 1. Any set of wavelength transition groupings in which Transition 2 and Transition 4 are not included in the same grouping may be safely applied to perform all of the required wavelength transitions.

Figure 13:
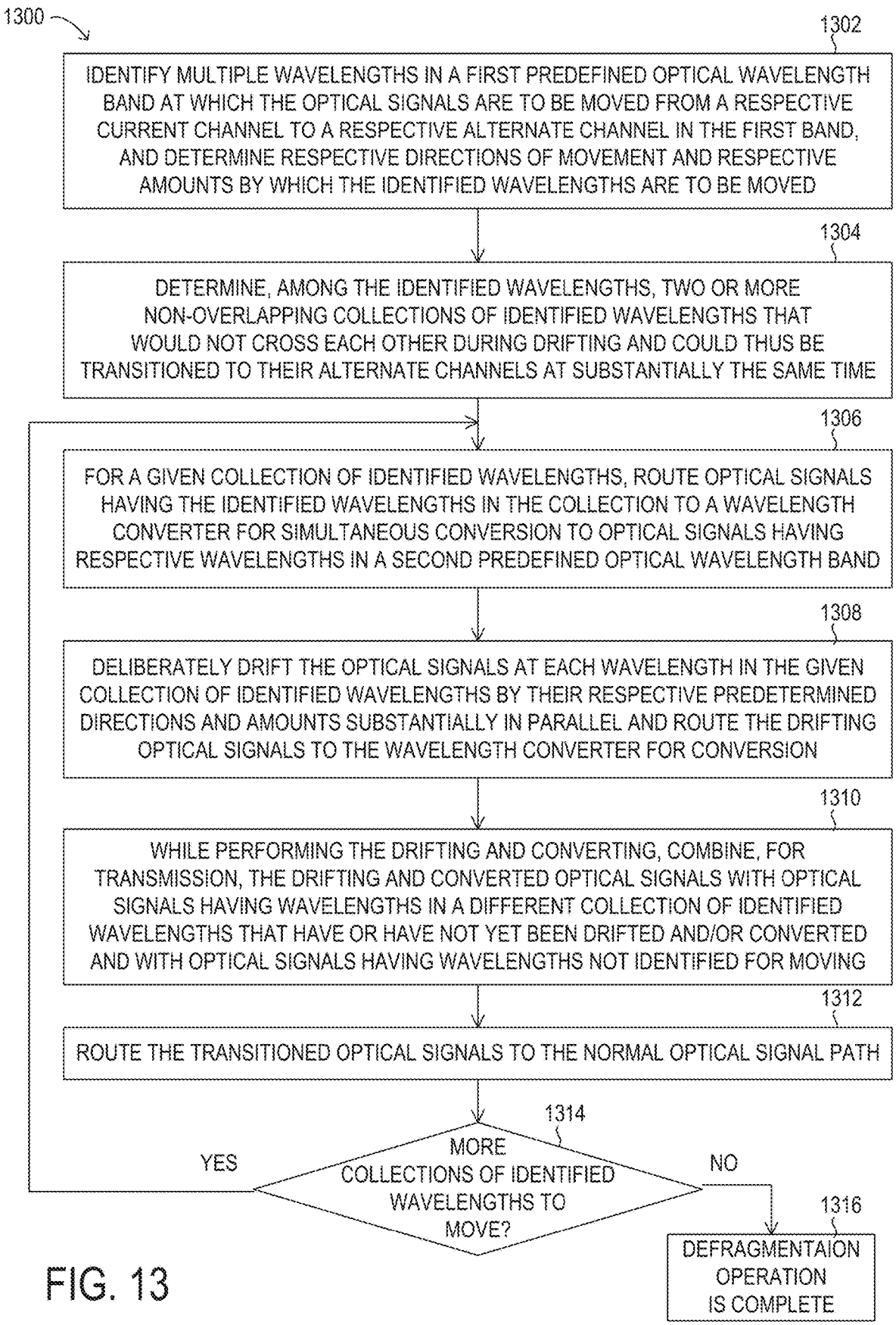
FIG. 13 is a flow chart of selected elements of a method for performing in-service defragmentation in an optical transport network including multiple wavelength transitions, in accordance with some embodiments.

Referring now to FIG. 13, a block diagram of selected elements of an embodiment of a method 1300 for performing in-service defragmentation in an optical network including multiple wavelength transitions, as described herein, is depicted in flowchart form. In various embodiments, some or all of the operations of method 1300 depicted in FIG. 13 may be performed by components of an optical network including, but not limited to, any of the components illustrated in FIGS. 1, 2A, 2B, 3B, 3C, 5, 6, 7, 9, 11, or 12. In some embodiments, at least some of the operations shown in FIG. 13 may be performed or initiated by an SDN controller or by a defragmentation controller process executing on an SDN controller. It is noted that certain operations described in method 1300 may be optional or may be rearranged in different embodiments. In at least some embodiments, some or all of the operations shown in FIG. 13 may be performed while the optical transport network in service, i.e., while continuing to exchange optical signal traffic with no interruptions for optical signals having wavelengths identified as wavelengths to remain on their respective current channels, and with very little interruption for each of the optical signals having wavelengths identified as wavelengths to be moved from a respective current channel to a respective alternate channel.

Method 1300 may begin, at 1302, by identifying multiple wavelengths within a first predefined optical wavelength band at which the optical signals are to be moved from a respective current channel to a respective alternate channel in the first band, the identifying including determining respective directions of movement and respective amounts by which the identified wavelengths are to be moved. For example, the first predefined optical wavelength band may be the C-Band (e.g., between 1530 and 1565 nanometers).

At 1304, the method may include determining, among the identified wavelengths, two or more non-overlapping collections of identified wavelengths that would not cross each other during drifting and could thus be transitioned to their respective alternate channels at substantially the same time. In some embodiments, determining the non-overlapping collections of identified wavelengths may be performed as an element of a process to identify the wavelengths to be moved, their respective directions of movement, and the respective amounts by which each identified wavelength is to be moved. In other embodiments, determining the non-overlapping collections of identified wavelengths may be performed as an element of a process to implement the movement of the identified wavelengths, such as a process performed by an SDN controller.

At 1306, method 1300 may include for a given one of the collections of identified wavelengths, routing optical signals having the identified wavelengths in the given collection to a wavelength converter for simultaneous conversion to optical signals having respective wavelengths within a second predefined optical wavelength band. For example, optical signals having wavelengths within the C-Band may be converted optical signals having wavelengths within the L-Band (e.g., between 1565 and 1625 nanometers). In some embodiments, an SDN controller may issue one or more commands to a drop complex causing the drop complex to route the given collection of wavelengths to an alternate optical signal path that includes the wavelength converter for conversion to respective wavelengths within the second predefined optical wavelength band.

At 1308, the method may include deliberately drifting the optical signals at each wavelength in the given collection of identified wavelengths by their respective predetermined directions and amounts substantially in parallel and routing the drifting optical signals to the wavelength converter for conversion. In some embodiments, an SDN controller may, for each wavelength in the given collection of identified wavelengths, issue a series of commands to incrementally adjust the wavelength in its respective predetermined direction and, collectively, by its respective predetermined amount.

At 1310, method 1300 may include, while performing the drifting and converting, combining, for transmission, the drifting and converted optical signals with optical signals having wavelengths in a different collection of identified wavelengths that have or have not yet been drifted and/or converted and with optical signals having wavelengths not identified for moving. In some embodiments, the optical signals may be combined by a band combiner at the transmission location.

At 1312, the method may include, after completing the wavelength transitions for all of the wavelengths in the given collection of identified wavelengths, ceasing to route the transitioned optical signals previously having the wavelengths in the given collection of identified wavelengths to the wavelength converter on the alternate optical signal path, routing them instead to the normal optical signal path.

If, at 1314, there are more collections of identified wavelengths to be moved to alternate channels as part of the defragmentation operation, method 1300 may return to 1306, after which the operations shown in 1306 through 1312 may be repeated for each additional collection of identified wavelengths.

If, or once, at 1314, there are no additional collections of identified wavelengths to be moved to alternate channels as part of the defragmentation operation, the defragmentation operation is complete, as shown at 1316.

While FIG. 13 illustrates an example embodiment in which the first predefined optical wavelength band is the C-Band and the second predefined optical wavelength band is the L-Band, in other embodiments, one or more of the first and second predefined optical wavelength bands may be different than in this example embodiment. For example, in some embodiments, the first predefined optical wavelength band may be the C-Band and the second predefined optical wavelength band may be the S-Band. In another example, the first predefined optical wavelength band may be the L-Band and the second predefined optical wavelength band may be the C-Band. In general, the multiple predefined optical wavelength bands may include two or more of the C-Band, comprising wavelengths between 1530 and 1565 nanometers, the L-Band, comprising wavelengths between 1565 and 1625 nanometers, and the S-Band, comprising wavelengths between 1460 and 1530 nanometers, in various embodiments.

Referring now to FIG. 14, a block diagram of selected elements of an embodiment of SDN controller 1400 is illustrated. SDN controller 1400 in FIG. 14 may be implemented to control and configure optical transport network 101 illustrated in FIG. 1, optical transport network 200 illustrated in FIG. 2 or optical transport network 500 illustrated in FIGS. 5, 7, 9, 11, and 12, and is a schematic diagram for descriptive purposes.

In FIG. 14, SDN controller 1400 is represented as a computer system including physical and logical components for controlling and configuring an optical network, as described herein, and may accordingly include processor 1410, memory 1450, and network interface 1440. Processor 1410 may represent one or more individual processing units and may execute program instructions, interpret data, process data stored by memory 1450. It is noted that SDN controller 1400 may be implemented differently in different embodiments. For example, in some embodiments, SDN controller 1400 may be implemented using a network node. In particular embodiments, memory 1450 may store executable instructions in the form of a software controller 1420 executing on processor 1410. For example, software controller 1420 may include functionality for network intelligence and control and may comprise applications (or software modules) that support the ability to establish network services, including applications or modules for discovery, routing, path computation, signaling, and other functions. The applications or modules that make up software controller 1420 may work together to automatically establish services within the optical network in response to requests for service.

As shown, memory 1450 may also store defragmentation controller 1430, which may represent executable code stored in memory 1450 to implement one or more of identifying wavelengths within a first predefined optical wavelength band as requiring transition from a current channel to an alternate channel within the first predefined optical wavelength band, determining a respective direction in which to move each wavelength and an amount by which to move each wavelength, determining, among wavelengths identified as requiring transition, two or more non-overlapping collections of identified wavelengths that would not cross each other during drifting and could thus be transitioned to their respective alternate channels substantially in parallel, issuing commands to drop complexes to route identified wavelengths, either individually or collectively, to alternate optical signal paths that include wavelength converters for handling drifting optical signals during wavelength transitions, issuing, to one or more transponders for each identified wavelength, a series of commands to incrementally adjust the wavelength in its respective predetermined direction and, collectively, by its respective predetermined amount, and issuing commands to the drop complexes to route optical signals having transitioned wavelengths to the normal optical signal path for normal operation once their wavelength transitions are complete.

In some embodiments, defragmentation controller 1430 may include instructions executable to perform these functions in conjunction with, or based on predictions or defragmentation recommendations made using, a suitable commercial, standard, or custom defragmentation algorithm or based on predictions or defragmentation recommendations made by another element of software controller 1420.

In FIG. 14, memory 1450 may be communicatively coupled to processor 1410 and may comprise a system, device, or apparatus suitable to retain program instructions or data for a period of time (e.g., computer-readable media). Memory 1450 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 1450 may include different numbers of physical storage devices, in various embodiments. As shown in FIG. 14, memory 1450 may include software controller 1420 and defragmentation controller 1430, among other applications or programs available for execution.

While the techniques described herein for performing in-service defragmentation in optical networks using wavelength conversion are illustrated in several examples in terms of unidirectional optical signal traffic, in some embodiments these techniques may be applied to perform in-service defragmentation using wavelength conversion for bidirectional optical signal traffic. For example, in some embodiments, wavelength converters at a location A may be configured to convert optical signals to be transmitted to a location B and having wavelengths within a first predefined optical wavelength band to optical signals having wavelengths within a second predefined optical wavelength band prior to transitioning the optical signals from a current channel within the first predefined optical channel to an alternate channel in the first predefined optical channel. Similarly, wavelength converters at a location B may be configured to convert optical signals to be transmitted to a location A and having wavelengths within a first predefined optical wavelength band to optical signals having wavelengths within a second predefined optical wavelength band prior to transitioning the optical signals from a current channel within the first predefined optical channel to an alternate channel in the first predefined optical channel. In other embodiments, one or more wavelength converters at each location may be configured to convert a subset of the optical signal traffic exchanged between the locations from the first predefined optical wavelength band to the second predefined optical wavelength band during wavelength transitions and one or more other wavelength converters at each location may be configured to convert the subset of the received optical signal traffic from the second predefined optical wavelength band to the first predefined optical wavelength band.

While several example embodiments are described herein in which optical signals having wavelengths within the C-Band are converted to optical signals having wavelengths within the L-Band during wavelength transitions, other wavelength conversions are possible, in other embodiments. In general, a wavelength converter device such as those described herein may be configured to convert optical signals between any two of the C-Band, the S-Band, and the L-Band, in different embodiments.

In various embodiments, the optical transport networks described herein may include wavelength converters configured to convert optical signal traffic from one predefined optical wavelength band to another predefined optical wavelength band during wavelength transitions of a defragmentation operation. Unlike with existing defragmentation methods that are performed out-of-service, causing service interruptions, the techniques described herein for performing defragmentation in optical networks using wavelength conversion may be performed while the optical transport network is in service and continues to exchange optical signal traffic. In addition, the disclosed techniques do not require an alternate fiber for carrying optical signal traffic during defragmentation operations, and they may be partially or completely automated using an SDN controller.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for in-service defragmentation of a transmission spectrum using wavelength conversion, comprising:
    a fiber cable between a first location and a second location;
    a first collection of transponders at the first location configured to:
        generate optical signal traffic as optical signals having wavelengths within a first one of multiple predefined optical wavelength bands including optical signals having a first wavelength within the first predefined optical wavelength band identified as a wavelength to be moved from a first current channel to a first alternate channel within the first predefined optical wavelength band and optical signals having one or more other wavelengths within the first predefined optical wavelength band identified as wavelengths to remain on their respective current channels; and
        exchange the generated optical signal traffic with a second collection of transponders at the second location over the fiber cable;
    a first reconfigurable optical add-drop multiplexer (ROADM) at the first location assigned to a first ROADM degree and comprising a first band expansion port to receive optical signals and a band combiner;
    a second ROADM at the first location assigned to a second ROADM degree;
    a first optical wavelength converter at the first location coupled to receive optical signals from the second ROADM and coupled to provide optical signals to the first ROADM via the first band expansion port; and
    a first drop complex at the first location configured to route the optical signals having the one or more other wavelengths within the first predefined optical wavelength band from the first collection of transponders to the first ROADM and to route the optical signals having the first wavelength from the first collection of transponders to the second ROADM;
    wherein the first collection of transponders is further configured to deliberately drift the optical signals having the first wavelength in a predetermined first direction and by a predetermined first amount from the first wavelength to a second wavelength corresponding to the first alternate channel within the first predefined optical wavelength band while continuing to exchange the optical signal traffic with the second collection of transponders at the second location over the fiber cable;
    wherein the first optical wavelength converter is configured to, while the first collection of transponders continues to exchange the optical signal traffic with the second collection of transponders at the second location over the fiber cable, convert optical signals received from the second ROADM and having wavelengths within the first predefined optical wavelength band to corresponding optical signals having respective wavelengths within a second one of the multiple predefined optical wavelength bands and provide the converted optical signals to the first ROADM via the first band expansion port as first converted signals;
    wherein the first drop complex is further configured to route the drifting optical signals previously having the first wavelength from the first collection of transponders to the second ROADM; and
    wherein the band combiner is configured to combine the first converted optical signals having respective wavelengths within the second predefined optical wavelength band and received via the first band expansion port with the optical signals having the one or more other wavelengths within the first predefined optical wavelength band to generate the optical signal traffic exchanged between the first collection of transponders at the first location and the second collection of transponders at the second location over the fiber cable.

2. The system of claim 1, wherein the first drop complex is further configured to, subsequent to the optical signals having the first wavelength being moved to the second wavelength corresponding to the first alternate channel within the first predefined optical wavelength band, route the optical signals having the second wavelength from the first collection of transponders to the first ROADM.

3. The system of claim 1, wherein the first wavelength converter comprises a nonlinear medium that converts wavelengths within the first one of the multiple predefined optical wavelength bands to respective wavelengths within the second one of the multiple predefined optical wavelength bands.

4. The system of claim 1, wherein:
the first wavelength is one of a plurality of wavelengths generated by the first collection of transponders and identified as wavelengths to be moved from a respective current channel to a respective alternate channel within the first predefined optical wavelength band, the plurality of identified wavelengths including a third wavelength within the first predefined optical wavelength band;
the first drop complex is further configured to route the optical signals having the third wavelength from the first collection of transponders to the second ROADM;
the first collection of transponders is further configured to deliberately drift the optical signals having the third wavelength in a predetermined second direction and by a predetermined second amount from the third wavelength to a fourth wavelength corresponding to the respective alternate channel within the first predefined optical wavelength band for the optical signals having the third wavelength while continuing to exchange the optical signal traffic with the second collection of transponders at the second location over the fiber cable and substantially in parallel with deliberately drifting the optical signals having the first wavelength in the predetermined first direction and by the predetermined first amount to the second wavelength within the second predefined optical wavelength band;
the first optical wavelength converter is further configured to, while the first collection of transponders continues to exchange the optical signal traffic with the second collection of transponders at the second location over the fiber cable and simultaneously with converting the optical signals received from the second ROADM and having wavelengths within the first predefined optical wavelength band to respective optical signals having wavelengths within the second predefined optical wavelength band and providing the first converted optical signals to the first ROADM, convert optical signals received from the second ROADM and having wavelengths within the third predefined optical wavelength band to corresponding optical signals having respective wavelengths within the second predefined optical wavelength band and provide the converted optical signals to the first ROADM via the first band expansion port as second converted signals; and
the first drop complex is further configured to route the drifting optical signals previously having the third wavelength from the first collection of transponders to the second ROADM.

5. The system of claim 4, further comprising a software-defined networking (SDN) controller configured to perform one or more of:
identifying the first wavelength and the third wavelength as wavelengths to be moved from a respective current channel to a respective alternate channel within the first predefined optical wavelength band, the identifying including determining a respective direction in which to move the each identified wavelength and a respective amount by which to move each identified wavelength;
identifying the one or more other wavelengths within the first predefined optical wavelength band identified as wavelengths to remain on their respective current channels;
issuing a command to the first drop complex to cause the first drop complex to route the optical signals having the one or more other wavelengths within the first predefined optical wavelength band from the first collection of transponders to the first ROADM and to route the optical signals having the first wavelength and optical signals having the third wavelength from the first collection of transponders to the second ROADM;
issuing a command to the first optical wavelength converter to convert the optical signals received from the second ROADM and having wavelengths within the first predefined optical wavelength band to the respective optical signals having wavelengths within the second predefined optical wavelength band and to provide the converted optical signals to the first ROADM via the first band expansion port;
issuing a command to the first collection of transponders to cause the first collection of transponders to deliberately drift the optical signals having the first wavelength in the predetermined first direction and by the predetermined first amount from the first wavelength to the second wavelength corresponding to the first alternate channel within the first predefined optical wavelength band and, substantially in parallel, to deliberately drift the optical signals having the third wavelength in a predetermined second direction and by a predetermined second amount from the third wavelength to a fourth wavelength corresponding to the respective alternate channel within the first predefined optical wavelength band for the optical signals having the third wavelength; and
issuing a command to the first drop complex to cause the first drop complex to route the drifting optical signals previously having the first wavelength and the drifting optical signals previously having the third wavelength from the first collection of transponders to the second ROADM.

6. The system of claim 5, wherein the SDN controller is further configured to:
determine two or more non-overlapping collections of wavelengths within the plurality of wavelengths generated by the first collection of transponders and identified as wavelengths to be moved from a respective current channel to a respective alternate channel within the first predefined optical wavelength band in which the optical signals having the wavelengths in the collection can be drifted to wavelengths within the second predefined optical wavelength band corresponding to their respective alternate channels substantially in parallel without interfering with each other, a first one of the two or more collections of wavelengths including the first wavelength and the third wavelength; and
subsequent to the optical signals having wavelengths in the first collection of wavelengths being moved from their respective current channels to their respective alternate channels, to issue one or more commands to cause optical signals having wavelengths within a second one of the two or more collections of wavelengths to be moved from their respective current channels to their respective alternate channels.

7. The system of claim 6, wherein, for each of the two or more collections of wavelengths, a predetermined direction in which each of the optical signals having wavelengths in the collection of wavelengths are deliberately drifted is a same direction.

8. The system of claim 1, wherein to deliberately drift the optical signals having the first wavelength in the predetermined first direction and by the predetermined first amount from the first wavelength to the second wavelength, the first collection of transponders is configured to perform a series of incremental adjustments to the wavelength of the optical signals previously having the first wavelength in the predetermined first direction that collectively transition the wavelength of the optical signals previously having the first wavelength by the predetermined first amount.

9. The system of claim 1, further comprising, at the second location:
  a third ROADM assigned to a third ROADM degree and comprising a second band expansion port;
  a fourth ROADM assigned to a fourth ROADM degree;
  a second optical wavelength converter coupled to receive optical signals from the third ROADM via the second band expansion port and coupled to provide converted optical signals to the fourth ROADM, the second optical wavelength converter being configured to convert optical signals having wavelengths within the second predefined optical wavelength band to respective optical signals having wavelengths within the first predefined optical wavelength band;
  a band splitter of the third ROADM configured to:
    receive optical traffic over the fiber cable including optical signals having wavelengths within the first predefined optical wavelength band and optical signals having wavelengths within the second predefined optical wavelength band; and
    route the optical signals having wavelengths within the second predefined optical wavelength band to the second optical wavelength converter via the second band expansion port; and
  a second drop complex configured to:
    combine the optical signals received over the fiber cable by the third ROADM and having wavelengths within the first predefined optical wavelength with the converted optical signals received from the second optical wavelength converter by the fourth ROADM and having wavelengths within the first predefined optical wavelength band; and
    provide the combined optical signals to the second collection of transponders.

10. The system of claim 1, wherein the multiple predefined optical wavelength bands comprise two or more of:
  the C-Band, comprising wavelengths between 1530 and 1565 nanometers;
  the L-Band, comprising wavelengths between 1565 and 1625 nanometers; and
  the S-Band, comprising wavelengths between 1460 and 1530 nanometers.

11. The system of claim 10, wherein the first predefined optical wavelength band is the C-Band and the second predefined optical wavelength band is the L-Band.

12. A method for defragmentation of a transmission spectrum using wavelength conversion, comprising:
  beginning to exchange optical signal traffic between a first location and a second location over a fiber cable of an optical transport network, the optical signal traffic comprising optical signals generated at the first location and having wavelengths within a first one of multiple predefined optical wavelength bands;
  identifying a first wavelength within the first predefined optical wavelength band as a wavelength for which optical signals generated at the first location and having the wavelength are to be moved from a first current channel to a first alternate channel within the first predefined optical wavelength band, the identifying including determining a first direction in which to move the first wavelength and a first amount by which to move the first wavelength;
  identifying optical signals generated at the first location and having one or more other wavelengths within the first predefined optical wavelength band as optical signals having wavelengths to remain on their respective current channels; and
  while continuing to exchange the optical signal traffic between the first location and the second location over the fiber cable:
    routing the optical signals having the one or more other wavelengths within the first predefined optical wavelength band to a first reconfigurable optical add-drop multiplexer (ROADM) at the first location;
    routing the optical signals having the first wavelength to a second ROADM at the first location;
    beginning to deliberately drift the optical signals having the first wavelength in the determined first direction and by the determined first amount from the first wavelength to a second wavelength corresponding to the first alternate channel within the first predefined optical wavelength band;
    routing the drifting optical signals previously having the first wavelength to the second ROADM;
    converting, at the first location, optical signals routed to the second ROADM and having wavelengths within the first predefined optical wavelength band to corresponding optical signals having respective wavelengths within a second one of the multiple predefined optical wavelength bands; and
    combining, at the first location, the converted optical signals having respective wavelengths within the second predefined optical wavelength band with the optical signals having the one or more other wavelengths within the first predefined optical wavelength band to generate combined optical signal traffic to be transmitted from the first location to the second location over the fiber cable.

13. The method of claim 12, further comprising, at the second location:
  receiving, by a third ROADM, the combined optical signal traffic;
  routing the optical signals within the received combined optical signal traffic and having wavelengths within the second predefined optical wavelength band to a second optical wavelength converter;
  converting the optical signals routed to the second optical wavelength converter and having wavelengths within the second predefined optical wavelength band to corresponding optical signals having respective wavelengths with the first predefined optical wavelength band;
  routing the converted optical signals having respective wavelengths within the first predefined optical wavelength band from the second optical wavelength converter to a fourth ROADM; and
  combining the optical signals within the received combined optical signal traffic and having wavelengths within the first predefined optical wavelength with the converted optical signals received from the second optical wavelength converter by the fourth ROADM and having wavelengths within the first predefined optical wavelength band.

14. The method of claim 12, wherein:
identifying the first wavelength comprises identifying a plurality of wavelengths generated at the first location and identified as wavelengths to be moved from a respective current channel to a respective alternate channel within the first predefined optical wavelength band, the plurality of identified wavelengths including the first wavelength and a third wavelength within the first predefined optical wavelength band; and
the method further comprises:
  determining a second direction in which to move the third wavelength and a second amount by which to move the first wavelength; and
  while continuing to exchange the optical signal traffic between the first location and the second location over the fiber cable:
    routing optical signals having the third wavelength to the second ROADM at the first location;
    beginning to deliberately drift the optical signals having the third wavelength in the determined second direction and by the determined second amount from the third wavelength to a fourth wavelength corresponding to the respective alternate channel within the first predefined optical wavelength band for the optical signals having the third wavelength substantially in parallel with beginning to deliberately drift the optical signals having the first wavelength in the determined first direction and by the determined first amount from the first wavelength to the second wavelength corresponding to the first alternate channel within the first predefined optical wavelength band; and
    routing the drifting optical signals previously having the third wavelength to the second ROADM;
wherein converting optical signals routed to the second ROADM and having wavelengths within the first predefined optical wavelength band to corresponding optical signals having respective wavelengths within the second predefined optical wavelength band comprises converting the optical signals previously having the third wavelength to corresponding optical signals having respective wavelengths within the second predefined optical wavelength band simultaneously with converting the optical signals previously having the first wavelength to corresponding optical signals having respective wavelengths within the second predefined optical wavelength band.

15. The method of claim 14, further comprising:
determining two or more non-overlapping collections of wavelengths within the plurality of wavelengths generated at the first location and identified as wavelengths to be moved from a respective current channel to a respective alternate channel within the first predefined optical wavelength band in which the optical signals having the wavelengths in the collection can be drifted to wavelengths within the second predefined optical wavelength band corresponding to their respective alternate channels substantially in parallel without interfering with each other, a first one of the two or more collections of wavelengths including the first wavelength and the third wavelength; and
subsequent to the optical signals having wavelengths in the first collection of wavelengths being moved from their respective current channels to their respective alternate channels, moving optical signals having wavelengths in a second one of the two or more collections of wavelengths from their respective current channels to their respective alternate channels.

16. The method of claim 15, wherein, for each of the two or more collections of wavelengths, a predetermined direction in which each of the optical signals having wavelengths in the collection of wavelengths are deliberately drifted is a same direction.

17. The method of claim 15, wherein at least one of identifying the plurality of wavelengths generated at the first location and identified as wavelengths to be moved from a respective current channel to a respective alternate channel within the first predefined optical wavelength band and determining the two or more collections of wavelengths within the plurality of wavelengths generated at the first location and identified as wavelengths to be moved from a respective current channel to a respective alternate channel within the first predefined optical wavelength band in which the optical signals having the wavelengths in the collection can be drifted to wavelengths within the second predefined optical wavelength band corresponding to their respective alternate channels substantially in parallel without interfering with each other is performed automatically by a software-defined networking (SDN) controller in response to a request to perform a defragmentation operation.

18. The method of claim 12, wherein the multiple predefined optical wavelength bands comprise two or more of:
  the C-Band, comprising wavelengths between 1530 and 1565 nanometers;
  the L-Band, comprising wavelengths between 1565 and 1625 nanometers; and
  the S-Band, comprising wavelengths between 1460 and 1530 nanometers.

19. The method of claim 18, wherein the first predefined optical wavelength band is the C-Band and the second predefined optical wavelength band is the L-Band.

20. The method of claim 12, wherein deliberately drifting the optical signals having the first wavelength in the predetermined first direction and by the predetermined first amount from the first wavelength to the second wavelength comprises performing a series of incremental adjustments to the wavelength of the optical signals previously having the first wavelength in the predetermined first direction that collectively transition the wavelength of the optical signals previously having the first wavelength by the predetermined first amount.

* * * * *